United States Patent [19]

Dickinson

[11] Patent Number: 5,050,375

[45] Date of Patent: Sep. 24, 1991

[54] PRESSURIZED WET COMBUSTION AT INCREASED TEMPERATURE

[75] Inventor: Norman L. Dickinson, Monte Sereno, Calif.

[73] Assignee: Dipac Associates, Monte Sereno, Calif.

[21] Appl. No.: 388,069

[22] Filed: Jul. 21, 1989

Related U.S. Application Data

[63] Continuation-in-part of Ser. No. 123,280, Nov. 20, 1987, abandoned, which is a continuation-in-part of Ser. No. 813,486, Dec. 26, 1985, Pat. No. 4,714,032.

[51] Int. Cl.⁵ .............................. F02C 7/00; F02C 3/26
[52] U.S. Cl. ................................ 60/39.12; 60/39.464; 60/39.55; 110/238; 122/31.1
[58] Field of Search .................... 110/238; 122/31 R; 60/39.12, 39.464, 39.55

[56] References Cited

U.S. PATENT DOCUMENTS

| | | | |
|---|---|---|---|
| 4,380,960 | 4/1983 | Dickinson | 110/347 |
| 4,714,032 | 12/1987 | Dickinson | 110/238 X |
| 4,753,181 | 6/1988 | Sosnowski | 110/238 X |
| 4,764,105 | 8/1988 | McElroy | 110/238 |
| 4,785,748 | 11/1988 | Sujata et al. | 110/238 |
| 4,787,323 | 11/1988 | Beer et al. | 110/238 X |
| 4,802,423 | 2/1989 | Pennington | 110/238 X |

*Primary Examiner*—Allen M. Ostrager

[57] ABSTRACT

A pressurized combustion of slurries of low-cost, unbeneficiated solid fuels in the presence of steam and alkali in which sulfur oxide emissions are inherently low, emissions of nitrogen oxides controlled by the injection of a scavenging agent and emissions of particulates prevented by condensing steam on and around them. The combustion has applications to steam boilers, combined cycles and gas turbines, including steam injected (STIG) and intercooled steam injected (ISTIG) versions. Turbine blade and nozzle erosion and deposits are avoided by the effective wet separation of ash particles before reheating and expansion.

21 Claims, 4 Drawing Sheets

PRESSURIZED WET COMBUSTION AT INCREASED TEMPERATURE

CROSS-REFERENCE TO RELATED APPLICATIONS

This application is a continuation-in-part of co-pending application Ser. No. 123,280, filed Nov. 20, 1987, now abandoned, which is a continuation-in-part of application Ser. No. 813,486, filed Dec. 26, 1985 (now U.S. Pat. No. 4,714,032), which is itself cross-referenced to my U.S. Pat. Nos. 4,377,066 (A) and 4,380,960 (B).

BACKGROUND OF THE INVENTION

This and the referenced inventions are addressed to the related national problems of energy security and air quality. The economy and defense of the United States are vitally dependent upon petroleum, about 40 percent of which is currently imported. Its domestic production is falling and reserves severely depleted. In the recent past it has experienced serious interruptions in overseas sources outside its control, which were accompanied by a sharp escalation in prices.

Much of the petroleum consumption is of such a nature that it cannot be replaced by domestic fuels, such as coal and natural gas. On the other hand, it is possible for major consumers, particularly electric utilities and industry, to convert to domestic fuels. Substitution of natural gas is, in most cases, relatively easy but gas reserves, while temporarily adequate, are not sufficient for large scale petroleum replacement. Moreover, this resource, which is rich in hydrogen, ought to be reserved for uses to which it is uniquely suited, such as home heating and chemical syntheses.

Unless a boiler was originally designed for coal, conversion is comparatively difficult. But domestic supplies of this and similar fossil fuels are abundant and, from this standpoint, national policy should encourage their use, over petroleum and natural gas, wherever possible. There is, however, much opposition on grounds of air pollution, particularly in respect to oxides of sulfur and nitrogen, which are considered responsible for "acid rain".

Strenuous efforts are being put forth in many energy quarters to ameliorate the air pollution associated with coal burning, mainly in the direction of treating raw coals to reduce their sulfur content (beneficiation) and retrofitting existing boilers to minimize their sulfur and nitrogen oxide emissions. While redesign of burners and various limestone injection and scrubbing techniques have lowered emissions somewhat, retrofitting benefits are inherently limited by the fact that, from the standpoint of chemical thermodynamics, conventional combustion pressure (atmospheric) is too low and temperatures, 2700-3200 degrees Fahrenheit (F.), are too high.

Reference U.S. Pat. No. 4,380,960 (B) addresses both pressure and temperature, describing a pressurized combustion of alkalized solid fuel slurry at a temperature not exceeding 1600° F., the formation of both sulfur and nitrogen oxides thereby being drastically reduced. The combustion of this reference is suited to non-polluting boilers and boiler-based combined cycles but the temperature limitation is comparatively unattractive for gas turbines.

Gas turbines Pressurized combustion at controlled temperature is routine practice in the case of gas turbine engines, although essentially limited to premium fuels. These engines comprise an air compressor, a combustor to heat the compressed air by firing a fuel into it and a gas turbine expander to convert heat and pressure into mechanical energy, part of which is used to drive the compressor, the remainder being a useful product. Strictly speaking, only the expander is a turbine but the term "gas turbine" is commonly used to mean the complete engine. They are well established industrial means of converting the heating value of fuels (predominantly premium fuels such as natural gas or petroleum distillate) to mechanical energy, to power pipeline pumps and compressors and to generate peak load electricity. More recently, they have come to be regarded as a practical source of base electric load as well. In such cases, heat remaining in the turbine exhaust is generally converted to steam in a Heat Recovery Steam Generator (HRSG). This steam may drive a steam turbine, which can be coupled to a second electric generator, such a combination being a gas turbine-based combined cycle.

Concurrently, gas turbines equipped with HRSGs are enjoying considerable success in light industrial and institutional markets where small to medium amounts of both heat or steam and electricity are required (or can be sold), a practice known as co-generation.

The combustion of common fuels with stoichiometric air creates temperatures so high that even the exotic alloys used in jet and gas turbine engines cannot withstand them, so it is normal for the design to contemplate relatively high amounts of excess air which, by diluting the combustion gases, cools them to a temperature at which the turbine materials (in some cases, with the help of air or steam cooling) retain sufficient strength and creep resistance. Until recently, excess air of 200-300 percent was normal, so that the air compressor had to compress some 3 or 4 times as much air as needed for the combustion itself.

In general, the hot gas which powers a gas turbine engine is produced by firing the fuel directly into compressed air so that the turbine is exposed to a mixture of hot air and combustion products. An alternative is the externally (or indirect) fired gas turbine in which the fuel is burned in a furnace or fluidized bed and heat therefrom transferred to the compressed air through heat exchange surface. The turbine then sees only hot air and is not exposed to combustion products. Emission control problems are transferred to the flue gas from the furnace or fluidized bed.

Gas turbines developed specifically for industrial and utility service are in widespread use, but most of the recent advances have arisen from intensive developments in aircraft jet engines, particularly the capability to withstand higher turbine inlet temperatures. It has proved practical and economically attractive to adapt a jet engine to produce hot, pressurized gas which serves as the driving fluid for a power recovery turbine, whose shaft delivers mechanical energy to an electrical generator or other use.

Although the heat (and oxygen) in turbine exhaust is capable of generating a substantial amount of steam, it has been conventional practice to expand the combustion gases and steam in separate turbines, with separate generators. That is because steam can be condensed so as to create a vacuum, substantially increasing the expansion ratio and, therefore, the recoverable energy. If the steam had been combined with the combustion gases, the mixture could have been expanded no further than atmospheric pressure.

More recently, new blade materials and blade and nozzle cooling techniques are permitting turbine inlet temperatures above 2000° F. These developments have upset the old rationale for keeping combustion gases and steam separate. If steam is injected into the combustor to moderate the temperature, less excess air is required and less horsepower consumed to compress it. The higher turbine inlet temperature offsets the loss (for the steam component) of expansion ratio. Only one turbine-generator set is required. The acronym for a steam injected gas turbine is STIG.

Moreover, compression ratios are going up. The jet engine-derived General Electric LM-5000, already in service, has a combustion pressure of about 400 psi. A LM-8000 model, having a combustion pressure of about 500 psi, is on the drawing boards. A consortium of Japanese companies are reported to be developing a high temperature, high pressure turbine for combined cycle service with a combustion pressure of around 800 psi.

Heat of compression can make air very hot, creating problems of thermal expansion and loss of efficiency. Early jet engines used water injection to control air compressor temperatures when maximum power was required. When air (or other gas) is compressed industrially, beyond a compression ratio of roughly 6 or 7, it has long been the practice to cool it between stages (a stage being used herein to mean a contiguous series of rotors and stators in the same case) by exchange with cooling water (intercooling). Within the last several years some turbochargers for automotive engines (a gas turbine adaptation) have used intercoolers. With the new higher compression ratios, gas turbines, such as the LM-8000, will necessarily employ intercooling, an intercooled steam injected gas turbine being referred to as an ISTIG. A combustion pressure of the order of 800 psi could entail intercooling more than once.

If it is considered acceptable or desirable to inject steam into a gas turbine combustor there would be no theoretical objection to performing the intercooling by water injection (as in early jet engines) since the vaporized water would merely add to the steam content. This is, in fact, being done although the quality of the water has to be carefully monitored. An alternative is direct contact, preferably counter-current, with sufficient water to cool the gas to an approach to water temperature.

Technical literature has treated "STIG" and "IS-TIG" as generic terms although they are registered trademarks of the General Electric Co.

Just as the higher compression ratios require and benefit from intercooling, so can the similarly high expansion ratios benefit from interstage reheating. Gas turbines with both intercooling and reheating are on the drawing boards.

Early gas turbine engines required clean gaseous or distillate fuels. Considerable progress has been made in adapting heavy duty designs to certain less expensive residual fuels. The newer high temperature, high ratio aero-derived machines are, at present, limited to natural gas or clean distillate fuel, but the U.S. Department of Energy is contributing substantial support toward the development and testing of coal-water slurry-fired combustion systems for gas turbine engines, including the advanced aero-derivitives. Operating experience with such machines remains limited to premium fuels.

Adapting the simple gas turbine (leave alone a STIG or ISTIG) to burn coal is a formidable undertaking. In the 1950's and 60's, Bituminous Coal Research, Inc. mounted a determined, but unsuccessful, program to accomplish this objective. Similar attempts were made in Canada and Australia. Among the most stubborn problems have been erosion by ash particles, corrosion by vaporized coal salts and deposits on the sensitive turbine blades. Another is control of emissions, particularly sulfur and nitrogen oxides.

Fueling gas turbines with coal-water slurries is an outgrowth of the extensive research and testing in recent years for firing conventional boilers with Coal-Water Fuel (CWF), a highly beneficiated, concentrated, stabilized slurry containing about 30 percent water. CWFs are frequently proprietary and, according to the technical literature, cost at least twice as much as the coal from which they are made.

The erosion problem is being attacked on several fronts: the oldest method is to separate ash particles from combustion products by one of the known gas-solids separating devices, the most common being filters of various types and inertial separators of various configurations. Newer approaches contemplate removing as much of the ash as possible by strenuous beneficiation and grinding the fuel particles so fine that they follow the flow path of the gas, rather than impinging on blade surfaces.

Conventionally, gas turbine combustors are closely coupled with, and mounted on the same base, or frame, as the compressor and turbine(s). Such an assembly is referred to as a gas turbine set. Manufacturers would like to extend this practice to firing coal slurries, but the difficulty and space requirements of managing particulates is such that "off-base" or "off-frame" combustors, requiring transition pieces to extract compressed air from, and return hot gas to, the turbo-machinery, are also being considered.

Coal beneficiation is also being directed toward minimizing the sulfur in the slurry, thereby decreasing sulfur dioxide emissions. In some cases, this is sufficient for current regulations but not good enough to meet the stricter standards that environmentalists would like to have enacted. This method can be supplemented by blending ground lime or limestone into the coal slurry—at the expense of increasing the solids which must be separated and/or tolerated by the turbine.

Test firing of coal slurries reported so far is limited to static simulators. Early results indicate relatively severe deposits which are only partly removed by periodic abrasive and water injections (as used with heavy duty turbines burning residual fuel oil). The coal slurry-fired turbine, as heretofore conceived, appears to have a long way to go before it approaches the efficiency and reliability of its natural gas-fired equivalent.

Moderation of combustion temperatures by steam injection holds the formation of nitrogen oxides from natural gas to quite reasonable levels (apparently lower than equilibrium) but, should the STIGs and ISTIGs eventually prove capable of burning coal slurry, NOx emissions may be a problem.

However, methods of controlling the emission of nitrogen oxides from conventional boilers are coming into commericial use. These methods employ the injection into the flue gas of nitrogen oxide scavengers, such as ammonia and urea solution. When a catalyst is used to promote the reactions, the process is known as Selective Catalytic Reduction (SCR) and, when carried out without catalyst, Selective Non-catalytic Reduction (SNR). According to the literature, one SNR installation is able to achieve a nitrogen oxides reduction of 35 to 70 percent. This installation is meeting a local emission regulation of 225 ppm. In other SNR installations reductions of 60–80 percent are being realized.

U.S. Pat. No. 4,466,241 (inui et al) describes a waste heat recovery boiler (HRSG) for the exhaust of a gas turbine in which the steam generation surface is divided into two sections with injection of scavenging agent and beds of catalyst (SCR) between sections.

Rail transport of solid fuels from source to point of use adds substantially to their cost. For many years pipeline transport as a slurry in water has appeared to be an attractive alternative. There is one successful U.S. coal slurry pipeline; at destination the slurry is dewatered and dried for pulverized coal firing. It is to be noted that pipeline experience is with a simple slurry containing about 50 percent water so that, to convert it into CWF, dewatering, particle sizing and the addition of chemical additives are required. The surplus slurry water would usually present a disposal problem.

Traditionally, solid materials have been charged to pressurized processes by means of a plurality of "lock hoppers", which are intermittently filled, pressurized, discharged into the process and depressurized, before repeating the cycle. This cumbersome and inefficient method is giving way to charging the solids as a liquid slurry. Similarly, lock hoppers are conventionally used to remove a solid product from a pressurized process—ash (or "lash", a mixture of ash and spent limestone) in the case of pressurized combustions. Not only is it difficult to recover useful heat from hot powdered ash, or lash, but the system is expensive and wastes the pressure energy of the pressurizing gas. That bled off during depressurizing usually requires a bag filter or similar control for the dust it carries.

A recognized advantage of gas turbines and other forms of pressurized combustion, for electricity generation, is that units of significant capacity (100–400 Megawatts) are sufficiently compact to be shop fabricated (referred to as "modular construction"), whereas conventional boilers are so large they have to be fabricated onsite. Shop fabrication, where facilities and experienced labor and supervision are available, is both faster and less expensive than field fabrication. Both capital cost and construction time are significant factors in the cost of electricity.

Additional background may be found in the specification of the parent case.

SUMMARY OF THE INVENTION

Unbeneficiated slurry of a solid fuel, which may be as delivered by pipeline, is alkalized and charged, along with comparatively low excess air, to a pressurized combustion reactor. (The slurry water could have been of poor quality, otherwise requiring treatment before disposal.) I have discovered that, in the preferred pressure range of 350 to 1000 psi, emissions of sulfur and nitrogen oxides can be acceptable at reactor temperatures higher than heretofore disclosed, the preferred range being 1600° to 2400° F. Temperature in the reactor, which may be of entrained phase or fluidized bed type, is controlled in the preferred range by heat transfer and/or the injection of water and/or steam and, in the case of gas turbines, excess air.

In the presence of alkali and steam, the equilibrium concentration of sulfur dioxide, even with high sulfur coals, is below current emission standards. Although the concentration of nitrogen oxides, at equilibrium, ranges from less than 100 ppm to levels in excess of those currently allowed, operating gas turbines are demonstrating less-than equilibrium concentrations. Moreover, the temperature range overlaps that within which SNR is most effective (usually put at 1600–2000 degrees F.). Therefore, a known scavenger for nitrogen oxides, such as ammonia or urea solution, may be mixed with the hot combustion products. A NOx reduction catalyst may be used (SCR) but is usually not required, under these conditions, to bring this pollutant down to a satisfactory level. This NOx treatment is distinguished from known art in that it occurs at turbine inlet, rather than exhaust, pressure. The result is efficient production, from domestic solid fuels, of high temperature heat, or clean, hot pressurized gas or gas-steam mixture with low levels of acid gas emissions.

In common with embodiments of the parent cases and Patents A and B, gaseous products are cooled by transfer of useful heat to a temperature below their dewpoint. Condensation of water, on and around unseparated fine particles of ash, wet and transfer them to the aqueous phase and dissolve vaporized salts. Further wet washing (scrubbing) may be carried out if deemed advisable. Thus the turbine receives a particularly clean gas and emissions of particulates are extremely low.

The combustion temperatures contemplated in this invention (which are higher than those of the referenced cases) not only increase the rate of carbon-oxygen reactions but also those between carbon and steam, known as water gas reactions. (Products of the latter reactions, carbon monoxide and hydrogen, immediately burn to carbon dioxide and water vapor.) Increased conversion rates permit a decrease in reactor residence time and/or an increase in carbon conversion. More refractory fuels, such as Flexicoke, can thereby be readily utilized. The increased temperature differences available for heat transfer result in considerable savings in heat transfer surface and/or permit higher turbine inlet temperatures.

More significant is the fact that these higher combustion temperatures make economically attractive the co-expansion of steam and flue gas from solid fuels in gas turbines (STIGs and ISTIGs).

Although capable of utilizing refractory and high sulfur fuels, the invention may be advantageously applied to fossil and other fuels which are considered low grade, particularly those containing considerable moisture. Although some high moisture fuels require an excessive amount of water to form a fluid slurry, they may be concentrated by preheating them to a temperature at which they become less hydrophilic; then separating some of the freed water, as described in Patent B. Energy can be efficiently recovered from Refuse Derived Fuels, for example, in this manner.

The elements of the invention are the same whether energy is desired in the form of steam (boiler embodiments), steam and electricity (combined cycle embodiments) or only electricity (STIG and ISTIG embodiments). Boiler embodiments would normally employ temperatures in the lower part of the range whereas gas turbine embodiments would normally utilize the upper part of the range. Boiler embodiments may use either fluidized bed or entrained phase combustion reactors whereas the latter type is preferred for gas turbine embodiments.

In boiler and combined cycle embodiments, cooling of gaseous products is continued well beyond the dewpoint, additional sensible and latent heat being transferred to steam generation and/or feedwater preheat, or used for process heat. The cleaned flue gas, largely dehydrated by the further cooling, is reheated by exchange with hot gaseous combustion products before expansion in a turbine, or turbines, which produce power to drive the air compressors. In such embodiments flue gas reheating may be limited to a temperature which provides a power balance between turbines and compressors (boiler embodiments), or it may be carried to a temperature at which the turbines produce surplus power which can be converted into electricity. The latter embodiment is considered a combined cycle.

Since, in gas turbine embodiments with comparatively high turbine inlet temperatures, it is economically acceptable to expand flue gas and steam together, there is no need to dehydrate the flue gas by cooling to a comparatively low temperature. Instead, after giving up high level heat to reheat the gas-steam to the turbine(s), it may be quenched or washed with water slightly below its dewpoint to permit separation of a fines slurry. The preponderance of steam remains with the gas. Under some conditions a portion of the quench water can be vaporized into the gas, supplementing the quantity available for expansion.

It is characteristic of these combustions that excess air is comparatively low, typically 10–15 percent in boiler and combined cycle embodiments, and usually less than 150 percent in gas turbine embodiments.

In common with the referenced cases, combustion pressures above about 250 psi may entail intercooling and all embodiments employ reheating. In these respects, gas turbine technology (ISTIG) is only now coming into conformance. Described embodiments, in which the combustion temperature is controlled primarily by steam (or steam and water) injection, further parallel recent industry STIG developments. However, the subject embodiments are distinguished by the fact that they can be fueled by simple, unbeneficiated coal slurry, without blade erosion, corrosion or deposits and with low emissions.

An object of the invention is to decrease the nation's dependence on imported oil. Another object is to reduce the national emissions of acidic gases causing acid rain. Another object is to provide an improved means of obtaining heat and power from coal and other fossil and carbonaceous fuels. Another object is to improve the economics of utilizing fuels with high contents of sulfur, ash and/or moisture. A further object is to provide the fuels user increased flexibility toward alternative sources. A further object is to provide an economical means of producing, from solid fuels, clean, hot, pressurized flue gas-steam mixtures for driving gas turbines delivering mechanical energy. A further object is to provide a combustion suitable for modular apparatus of substantial electric generating capacity. A further object is to provide, from low cost solid fuels, an improved means of providing steam, pressurized flue gas-steam or carbon dioxide-steam mixtures for enhanced oil recovery. A further object is to provide an improved means of purifying contaminated waste waters concurrently with supplying heat and/or power. A related object is to provide an improved means of recovering the heating value of fuel delivered by slurry pipeline. Additional objects will be apparent from a consideration of the drawings and explanations thereof.

DESCRIPTION OF PREFERRED EMBODIMENTS

Figure 1:
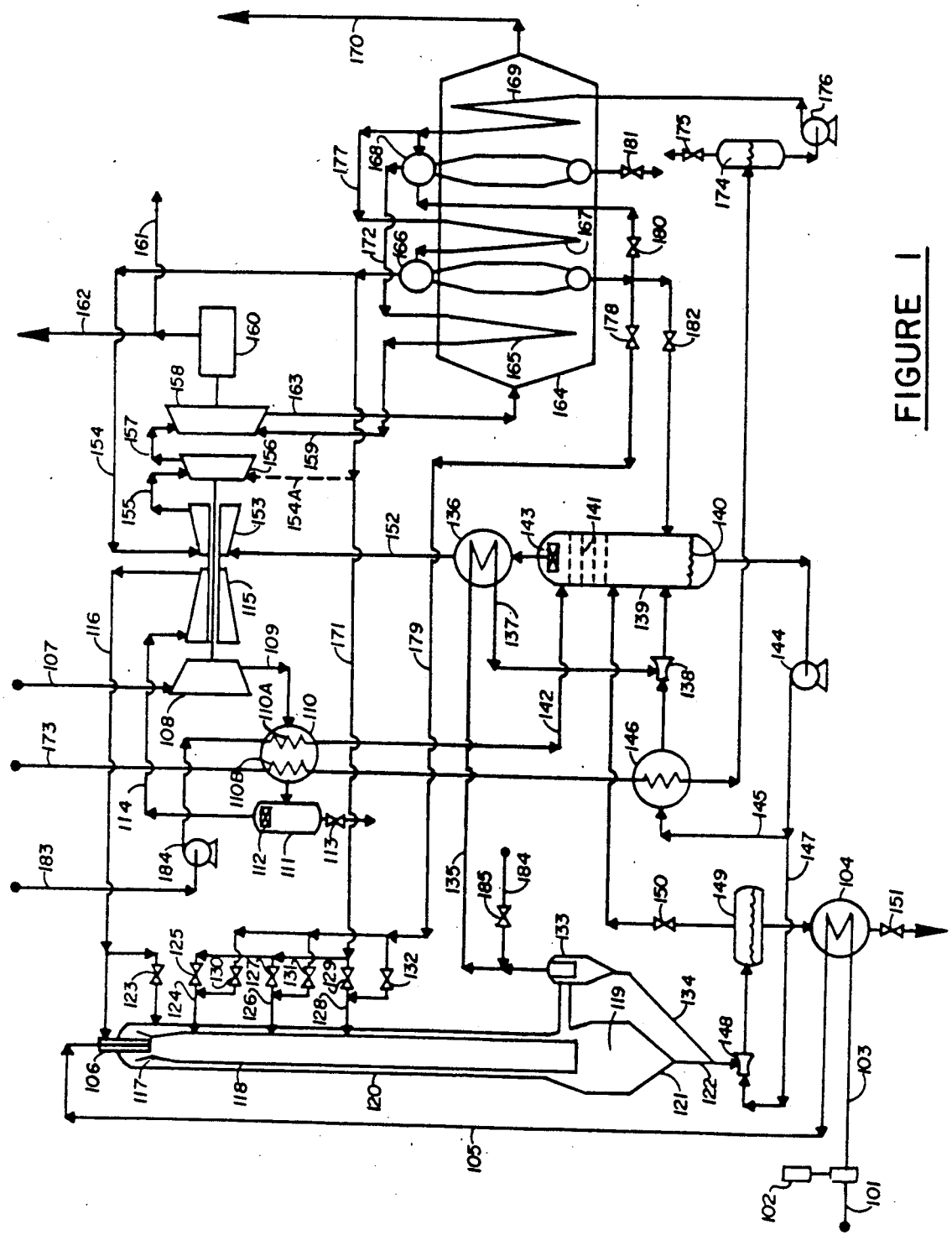
FIG. 1 is a schematic elevational diagram of a high temperature steam and water injected gas turbine embodiment, utilizing an entrained phase combustion reactor with gaseous combustion products recycle.

FIG. 1 illustrates an ISTIG cycle in which an alkalized slurry of solid fuel is burned with comparatively low excess air, the means of carrying out the combustion and control of nitrogen oxides and particulates being external to the turbo-machinery (off-base). Hot compressed air leaves the compressor, which is intercooled, and clean, hot, pressurized gas-steam is returned to the turbine.

With reference to FIG. 1, alkalized coal slurry is supplied from an off-site storage tank, through a line 101, to the suction of a fuel slurry charge pump 102. The pump 102 provides sufficient pressure to move the slurry via a line 103 through a fuel slurry preheat exchanger 104, and through a line 105 to a point of discharge at the center line of a fuel-air injection nozzle 106.

Atmospheric air enters the apparatus through a conduit 107, which may contain a conventional filter (not shown), and flows to the suction of a first stage air compressor 108, which delivers it at an elevated pressure, and a temperature raised by the heat of compression, through a line 109 to an intercooler 110 in which it is cooled by indirect exchange with cold wash water and boiler feedwater.

Atmospheric air contains a variable amount of water vapor (humidity). The intercooling may be discontinued before reaching the dewpoint of the partially compressed air. If continued to a temperature at which appreciable water vapor condenses to liquid water, it may be separated by means of a second-stage compressor suction drum 111 and mist extractor 112 and discharged from the apparatus through a valve 113. (Direct contact intercooling is a feasible alternative.)

Cooled air flows from the mist extractor 112 through a line 114 to the suction of a second-stage air compressor 115, which delivers it from the turbo-machinery, hot and at a further increased pressure, through a line 116 to an outer, annular portion of the fuel-air injection nozzle 106.

Fuel slurry and air discharge together, at relatively high velocity, through the throat of a venturi 117, into an elongated, entrained phase reactor 118. According to Bernoulli's well-known theorem, the mass velocity of fuel slurry and air creates a zone of reduced pressure in the venturi 117 which draws hot combustion products from a disengaging zone 119, through an annular recycle passage 120, to mix with the discharge from the nozzle 106, under the turbulent conditions existing immediately downstream.

The heat content of the recycled combustion products vaporizes the fuel slurry water and raises the temperature of the resulting air-steam-solids mixture above that at which combustion reactions are initiated. The diameter of the reactor 118 is chosen to provide a relatively high velocity combustion zone such that solid particles remain entrained in, and flow with, the gaseous phase. Fuel particles react with oxygen to release heat of combustion, causing the temperature of the mixture to rise.

Upon being discharged into the expanded-diameter disengaging zone 119, kinetic energy of solid product (lash) particles, together with the force of gravity, causes most of them to disengage from gaseous products and recycle, and fall to a conical bottom section 121, from which they are withdrawn through a standpipe 122.

The section 121 may contain aeration connections (not shown) through which air and/or steam is injected to maintain the solid particles in free-flowing (or "fluidized") condition. The amount of air and/or steam so injected may be sufficient to appreciably lower the temperature of the solids.

The air passage of the nozzle 106 may be divided into primary and secondary air passages and/or may contain swirl baffles and/or other dispersion and mixing means known to the arts of mixer and/or burner design, including air and/or steam atomization, may be employed to enhance the dispersion of fuel slurry droplets and their mixing with air and recycled combustion products. Secondary (or tertiary) air may also be added to the recycle stream, as through the valve 123. Combustion air may be further subdivided among one or more additional injection nozzles (not shown) downstream of the venturi 117.

The nozzle 106 may also be equipped with injection or atomizing devices for supplementary gas or liquid fuel and an ignition device, useful or necessary for heating up the reactor 118 and associated items from a cold start. The nozzle 106 may occupy a sufficient portion of the cross-sectional area of the reactor 118 that it is unnecessary to reduce it further by means of a defined venturi in order to induce the desired recirculation.

While the primary control of combustion temperature is by fuel slurry:air ratio, this temperature is moderated by the injection of high pressure steam through a connection 124 and a valve 125 and/or, a connection 126 and a valve 127 and/or a connection 128 and a valve 129.

To increase the production of electricity, without exceeding allowable temperatures, it is possible to charge additional fuel slurry (increasing the fuel slurry:air ratio and lowering excess air) while injecting water into the reactor 118 through one or more of the connections 124, 126 and 128, through valves 130, 131 and/or 132, or through separate water injection connections (not shown). Steam and water connections shown are illustrative; in practice a number of such points may be located along the length of the reactor 118. Because of turbulence in the reactor 118, mixing devices at the points of injection are not normally required but, in some cases, may be specified. Alternative means of steam injection include premixing with combustion air and use as an atomizing agent for the fuel slurry.

Figure 3:
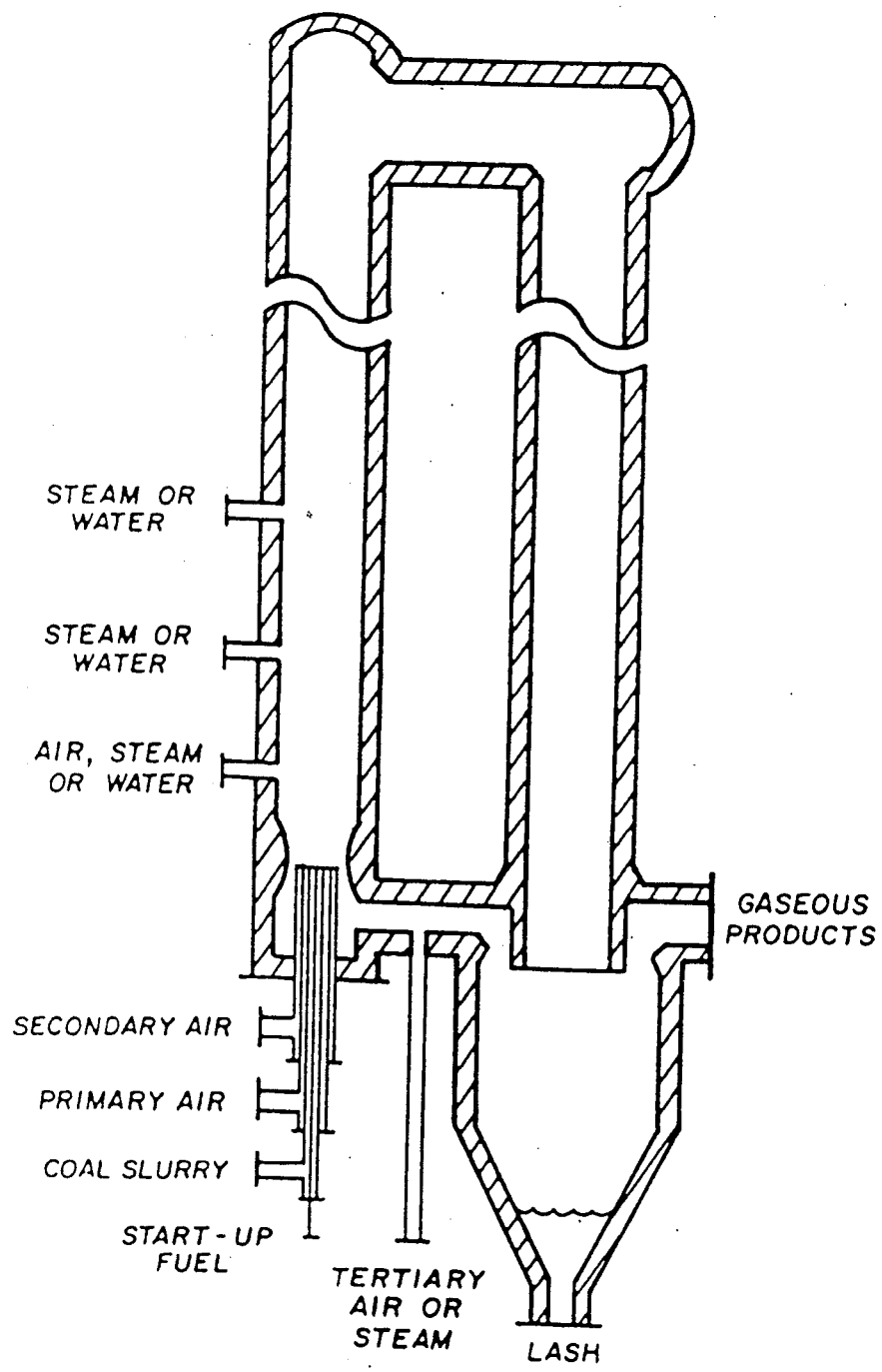
FIG. 3 is a schematic elevational diagram of a U-Tube entrained phase combustor suitable for the process of the invention, in particular the embodiment of FIG.1.

The assembly comprising items 106 and 117–121, incl. is referred to as a combustor. Since, in FIG. 1, the flow in the reactor 118 is downward, the assembly would be described as a downflow combustor with an annular recycle passage. Entrained phase combustors for my invention may also be upflow or horizontal and the recycle passage may be external, rather than axial with the reactor. The disengaging zone may be omitted, in which case the main solids separating function is taken over by an external separator. FIG. 3 is an alternative U-shaped combustor, permitting a comparatively short external recycle passage, as is FIG. 5 of Patent B.

The pressure difference between the two sides of the tube 118 is small but it is exposed to the full combustion temperature, including peaks which exceed the average. For some embodiments the temperature may be sufficiently moderate to permit the tube 118 to be constructed of high temperature metal alloy. For temperatures above the limits allowable for such alloys the tube 118 may be constructed of ceramic, cermet or composite materials and/or cooled by heat transfer to air, steam or vaporizing condensate.

Net gaseous products, carrying some fine particles, discharge to a cyclone separator 133. Utilizing centrifugal force, the separator 133 performs a further separation between entrained particles, which fall by gravity down a standpipe 134, and gaseous products, which leavy by means of a line 135. Other cyclone configurations, including multi-stage, or other known gas-solids separating devices, may be substituted for the cyclone 133. Gaseous products, still carrying fine particles (fines) unseparated in the cyclone 133, flow through the line 135 to a reheat exchanger 136, in which they indirectly transfer heat to washed gas-steam mixture. The partially cooled gaseous products, at a temperature a little above their dewpoint, flow via a line 137 to a venturi scrubber (or other gas-liquid contacting device) 138 in which they are quenched with cooled, recycled fines slurry. The amount of slurry directed to the venturi 138 is sufficient to saturate the gaseous products and remove fine particles from them. In doing so, a portion of the slurry water may be vaporized.

Gas-steam and fines slurry flow together to a washing vessel 139. The slurry collects in the lower part of the vessel 139 forming a fines slurry level 140. The gas-steam mixture flows upward through a plurality of gas washing elements 141 in which they are washed with clean hot water entering the vessel 139 by means of a line 142. Washed gas-steam leaves the vessel 139 through a mist extractor 143. To improve the washing action the ratio of water to gas in the washing elements 141 may be increased by recycling wash water from the lowest to the uppermost washing element by means of a sump, lines and pump (not shown).

A fines slurry pump 144 takes suction from the bottom of the vessel 139 and recirculates slurry through a line 145 and a fines slurry exchanger 146 to the venturi 138. The level 140 is maintained within a suitable range by withdrawing the net production of fines slurry from the discharge of the pump 144 through a line 147 to an eductor (or other solids-liquid mixing device) 148, to which is also directed the net production of ash and spent alkali withdrawn from the standpipes 132 and 134 (which may contain seal or flow control means not shown).

The eductor 148 mixes the dilute fines slurry with the solids from the standpipes 132 and 134, which carry with them gases characteristically accompanying fluidized solids. The gases flow as bubbles with the combined slurry to an ash slurry deaeration drum 149. In the drum 149 gravity causes the gas bubbles to disengage from the liquid slurry and form a continuous gaseous phase. The net accumulation of gas is vented from the upper part of the drum 149, under control of a vent valve 150, to a suitable point in the heat recovery section of the apparatus, such as the vessel 139. The temperature in the drum 149 is a function of the temperature and quantity of ash, relative to that of fines slurry. In most cases this temperature approaches the boiling point of water at system pressure. Consequently, the gas vented through the valve 150 may be accompanied by a substantial amount of steam, comprising a useful means of recovering heat from ash.

In cases of fuels having a comparatively low ash fusion temperature, and/or to which an ash fluxing agent has been added, the ash (or lash) particles may melt and enter the zone 119 as droplets, which coalesce to form a "slag" in the section 121. Extremely small droplets may entrain through to the cyclone 133 and be separated therein. The slag would be withdrawn through the standpipes 122 and 134, observing the art according to known slagging combustors, and be solidified to ash pellets upon mixing with the fines slurry in the eductor 148.

Ash slurry, from which gas bubbles have been largely disengaged, is withdrawn from the drum 149 through the the fuel slurry preheat exchanger 104, indirectly transferring therein a major portion of its sensible heat to fuel slurry. The level in the drum 149 is controlled, and proper pressure in the ash slurrying and cooling apparatus maintained, by the operation of a pressure reducing device 151, which discharges depressured, cooled ash slurry (lash slurry) from the apparatus.

The net input of wash water, which determines the quantity of fines slurry and hence of ash slurry, can be regulated so that the ash slurry contains just sufficient heat to preheat the fuel slurry to an economical approach to its temperature.

The water slurrying the ash particles contains dissolved salts originating with the coal and comprises a purge of these contaminants. If it is desired to dispose of ash and purge separately, they may be subjected to one of the known solids-liquids separating devices, such as the settler 262 of FIG. 2. In such case, part of the water separated from the ash may be recycled to the apparatus as fuel slurry water.

(This method of withdrawing powdered ash, or lash, mixing with an available aqueous fluid, separating fluidizing gas and steam, recovering heat from and depressuring the resulting slurry, is applicable to all pressurized combustions of finely divided solid fuel.)

Washed gas-steam, from which entrained water droplets have been removed by the mist extractor 143, flows to the reheat exchanger 136, in which it is reheated by indirect exchange to a temperature approaching that of gaseous products in the line 135. The reheated gas-steam returns to the turbo-machinery via a line 152 to be partially expanded through a first stage turbine 153 which delivers mechanical energy, in the form of shaft horsepower, to the second stage air compressor 115. In order to maintain critical components of the turbine 153 within safe operating temperatures, high pressure steam is supplied to internal cooling passages through a line 154.

Having been cooled by giving up energy in the turbine 153, the partially expanded gas-steam flows via a crossover 155 to be expanded further in a second stage turbine 156. Since the pressure energy in the first stage cooling steam is not fully recovered in the turbine 153, for energy balance purposes it is assumed to enter the inlet of the turbine 156, as indicated by dashed line 154A. The turbine 156 delivers mechanical energy, in the form of shaft horsepower, to the first stage air compressor 108.

Having been further cooled by giving up energy in the turbine 156, the partially expanded gas-steam flows via a crossover 157 to be expanded again in a third stage turbine 158. Supplementing the discharge of the turbine 156 for driving the turbine 158 is superheated intermediate pressure steam entering by means of a line 159. The turbine 158 delivers mechanical energy, in the form of shaft horsepower, to the generator 160 which converts the energy supplied to it into electricity. After diversion through a conduit 161 of electrical energy required for driving process pumps and other auxiliaries, such as lube oil pump, lights and instruments, the net production is delivered as the energy product of the apparatus via a conduit 162.

A minor proportion of the air in the line 116 may be diverted (through lines not shown) to the turbine 153 and/or the turbine 156 as supplementary coolants.

Figure 2:
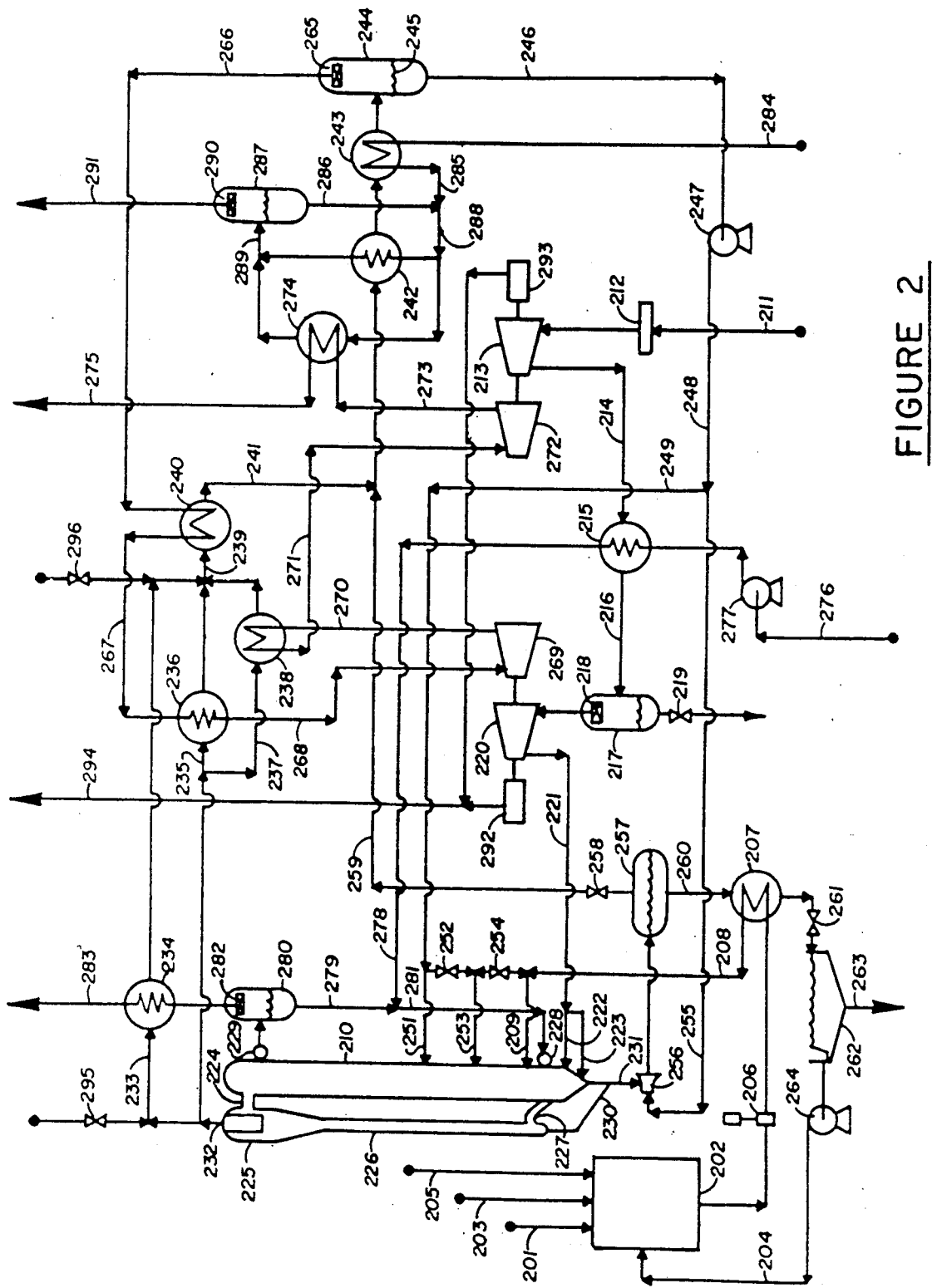
FIG. 2 is a schematic elevational diagram of a combined cycle, heat transfer embodiment utilizing a circulating fluidized bed reactor, capable of delivering energy as high pressure superheated steam, low pressure steam and electricity.

While overall air compression ratio could have been divided more-or-less equally between first and second stages, as diagrammed in FIG. 2, this embodiment is structured to take advantage of jet engine-derived turbo-machinery expected to be available. The discharge pressure of the turbine 153 is adjusted so that it produces only as much power as consumed by the air compressor 115. Similarly, the discharge pressure of the turbine 156 is adjusted so that it produces only as much power as consumed by the compressor 108, the excess potential energy in the reheated gas-steam being transferred to the turbine 158 in the form of pressurized exhaust.

To take maximum advantage of the pressure of the gas-steam transferred from the turbine 156 to the turbine 158 it would be desirable to reheat it. While it is possible to do so in a second reheat exchanger in parallel with the exchanger 136, the finite amount of heat available in combustion products in the line 135 would have to be divided between the two exchangers, resulting in a reduced inlet temperature to the turbine 153. The partially expanded gas-steam could also be reheated indirectly by external firing, which would require premium fuel, or a fluidized bed combustor.

A further reheat alternative comprises a second combustor, cyclone separator, reheat exchanger, quench, wash and fluidizing gas separator, generally similar to items 106, 117–119, 131–136, 148–150, resp., except that they would be designed for the lower interstage pressure. In such case, excess air in primary combustion products would probably be maximized by limiting steam and avoiding water injection into the reactor. To sustain the reheat combustion it might, nevertheless, be necessary to bypass some combustion air from an intermediate point in the compression train (where the pressure is appropriate) to the second combustor.

The turbine 158 discharges into an exhaust manifold 163, which conducts the gas-steam (turbine exhaust), now at a pressure slightly above atmospheric, to a Heat Recovery Steam Generator (HRSG) 164, which, as illustrated, comprises intermediate pressure superheater 165, high pressure boiler 166, high pressure economizer 167, intermediate pressure boiler 168 and lower temperature economizer 169. The boilers 166 and 168 are conventionally comprised of a steam drum, tubes through which heat is transferred to boiling feedwater and a lower header, sometimes referred to as a "mud drum".

Having been cooled by transferring its sensible heat, respectively, to intermediate pressure steam, high pressure steam generation, high pressure feedwater, intermediate pressure steam generation and low temperature feedwater, the gas-steam is exhausted to the atmosphere through the exhaust vent 170. High pressure steam generated in the boiler 166 is delivered through the line 154 as cooling steam to the turbine 153 and through a line 171 for injection into the reactor 118 through the connections 124, 126 and/or 128, or according to previously described alternatives.

The high pressure steam from the boiler 166 could have been superheated to a temperature approaching that of the exhaust from the turbine 158 in a coil (not shown) preceding the intermediate pressure superheated 165, but it was omitted from this embodiment because the amount of saturated steam which can be generated from the heat available is greater, and it is a more effective turbine coolant. Also, the intermediate pressure steam can be superheated to a higher temperature. While it is intended that the embodiment essentially observe this principle, it is desirable, as a practical matter, to superheat the high pressure steam slightly, to avoid troublesome condensation in lines, valves and connections. Superheating high pressure steam to the full extent remains a viable alternative.

Intermediate pressure steam generated in the boiler 168 flows via a crossover 172 to the intermediate pressure superheater 165 in which it is heated to a temperature approaching that of the exhaust from the turbine 158 and is delivered through the line 159 to the inlet of the turbine 158.

Boiler feedwater enters the apparatus, under pressure from an offsite pump, through a line 173 and is partially heated by indirect exchange with hot first stage compressed air in an intercooler coil 110B. It is then further heated by indirect exchange with recirculated fines slurry in the exchanger 146, after which it flows to a boiler feedwater accumulator 174.

From the accumulator 174, which may be a "deaerator" of proprietary design, formerly dissolved gases, liberated by the heating, are vented to the atmosphere through a valved 175. A boiler feedwater pump 176 takes suction from the accumulator 174 and delivers feedwater under sufficient pressure to cause it to flow through the low temperature economizer 169, a feedwater crossover 177, the high pressure economizer 167 and into the steam drum of the high pressure boiler 166. Feedwater required for the operation of the intermediate pressure boiler 168 is diverted from the main feedwater stream after passing through the economizer 169.

Should the operator desire to increase electricity production without exceeding temperatures allowable in reaction system and gas turbines, or divert part of the high pressure steam for offsite use, he may elect to increase fuel slurry flow while drawing hot water from the boiler 166 through a valve 178 and a line 179 and injecting it into the reactor 118 through the valves 130, 131 and/or 132. In extreme cases of steam diversion, this water injection may be the primary means of controlling combustion temperature below a predetermined maximum. Although the pressure of the boiler 166 is higher than that of the reactor 118, economical hydraulic design may indicate the desirability of a booster pump (not shown) in the line 179.

Transfer of injection water to the reactor 118 avoid excessive buildup of dissolved solids in the boiler 166 so that blowdown is not required. If water injection is not practiced, blowdown is transferred from the high pressure boiler 166 through a valve 180 to the intermediate pressure boiler 168 from which it is subsequently discharged through a valve 181. An alternative disposition is through a valve 182 to the lower part of the wash vessel 139. Intermediate pressure blowdown may join ash slurry or be used as fuel slurry water.

The HRSG 164 may be equipped for firing with supplemental fuel (i.e., employ "duct burners") and/or may comprise a third, low pressure boiler and economizer (not shown), delivering low pressure steam to an appropriate position in the third stage turbine and/or to offsite use. Although such a low pressure boiler would increase thermal efficiency, it is not shown because the added complication is deemed, in most cases, unwarranted.

Water, which needs be of quality sufficient only to minimize fouling in the intercooler 110 and/or, via traces carried through the mist extractor 143, the reheat exchanger 136, is brought from an offsite storage tank through a line 183 and given sufficient pressure by a wash water pump 184 to cause it to flow through an intercooler coil 110A, in which it is heated by indirect transfer from partially compressed air, and the line 142 to the uppermost washing element in the vessel 139.

In order to maximize overall efficiency, expressed in electrical production per unit of fuel heating value, the gas-steam to the turbine 153 is reheated to a relatively high temperature. To provide a temperature difference capable of economically transferring heat to the turbine inlet, the combustion would itself need to be controlled at a temperature higher than that of the turbine inlet (generally above 1600 and as high as 2600 degrees F.), at which formation of sulfur dioxide remains acceptable. Formation of nitrogen oxides is minimized by the staged introduction of air, i.e., divided among primary, secondary, and even tertiary and quarternary increments, but may nevertheless be higher than desired. In such case, a controlled amount of a known scavenging agent for nitrogen oxides, such as ammonia or urea (which may be diluted by an inert carrier such as air or stream), brought into the apparatus through a line 184 and a control means 185, may be injected into the inlet of the cyclone 133, the line 135 (as shown), or between sections of the exchanger 136 (where the temperature is deemed optimum for the scavenging reactions). In any case, the agent injection may be divided among a plurality of injection nozzles and/or a static or dynamic mixing device installed downstream of the injection location(s). It is also within the scope of the invention to assist the scavenging reactions with a bed of proprietary SCR catalyst.

A typical solid fuel would comprise a high sulfur coal. However, energy may also be recovered advantageously from fossil and other fuels considered low grade by virtue of their moisture content. If the amount of water required to slurry them is excessive the slurry may be concentrated, before charging to the combusion, by preheating to a temperature at which they become less hydrophilic and separating previously bound water (which may be recycled to the slurrying step), as described in Patent B. This preparation may be termed "slurry-phase carbonization" or "thermal pretreatment".

Not shown in FIG. 1 are auxiliary systems and equipment, such as those needed to start up the apparatus when cold. These would include a small auxiliary oil or liquified petroleum gas fuel system and burner, or burners, and a source of starting power for the turbo-machinery.

Because of rotary compressor characteristics and the desirability of maintaining a minimum linear velocity in the reactor 118, so that fuel and recycled solids remain entrained, the combustion may operate, during periods of idling or low load, at reduced pressure and/or relatively high excess air.

Although the illustrated configuration of compressors and turbines is patterned after the General Electric Model LM-8000, the principles embodied are applicable to present and future compressors and gas turbines of this and other manufacturers, configured in a variety of ways.

EXAMPLE

In a computer simulation, a 50 percent slurry of Illinois coal, containing ground limestone equivalent to a 25 percent excess in terms of sulfur equivalent, was charged to the steam injected, wet combustion of FIG. 1, utilizing a modified intercooled GE LM-8000 aviation-derived turbine generator. All of the high pressure steam available from the HRSG, except for turbine cooling steam amounting to 8 percent of the combustion air, was injected into the combustion reactor. All of the intermediate pressure steam was superheated, as permitted by turbine exhaust temperature, and injected into the inlet of the third stage turbine. No water was injected into the reactor. Combustion temperature was set at 2500 F. System flows, temperatures and pressures, excess air and electricity production and thermal efficiency were determined:

| Flow Rates, Lb/Sec: | |
| --- | --- |
| Air Compressed (dry) | 353 |
| Coal charged | 24.7 |
| Limestone charged | 4.3 |
| Coal Slurry Water | 24.7 |
| Turbine Cooling Steam | 28.2 |
| Reactor Injection Steam | 40 |
| Intermediate Pressure Steam | 8.8 |
| Wash Water | 30.5 |
| Ash Slurry | 39.5 |
| Excess Air, Percent | 52 |
| Horsepowers: | |
| First Stage Compressor | 23,619 |
| Second Stage Compressor | 81,366 |
| First Stage Turbine | 81,129 |
| Second Stage Turbine | 23,567 |
| Third Stage Turbine | 211,482 |
| Megawatts Generated | 153.0 |
| Megawatts Consumed by Process Pumps | .4 |
| Thermal Efficiency | 47.2 |
| Pressures, Psia: | |
| First Stage Compressor Discharge | 500 |
| First Stage Turbine Inlet | 450 |
| Second Stage Turbine Inlet | 220.5 |
| Third Stage Turbine Inlet | 179.3 |
| High Pressure Steam Generation | 548 |
| Interm. Pressure Steam Generation | 209 |
| Temperatures, Degrees F.: | |
| Combustion | 2500 |
| First Stage Turbine Inlet | 2451 |
| Second Stage Turbine Inlet | 1904 |
| Third Stage Turbine Inlet | 1775 |
| Third Stage Turbine Discharge | 857 |
| Ash Slurry Discharge | 85 |
| Preheated Boiler Feedwater | 283 |
| High Pressure Steam | 477 |
| Superh. Interm. Press. Steam | 832 |
| First Pinch Point | 497 |
| Second Pinch Point | 406 |
| Exhaust | 348 |
| Heat Exchanger Duties, Btu/Sec: | |
| Compressor Intercooler | 19,735 |
| Ash Slurry-Coal Slurry | 12,389 |
| Gas-Steam Reheat | 299,116 |
| Fines Slurry-Boiler Feedwater | 3,805 |

Allowance has been made in the computations for energy consumed by coal slurry, boiler feedwater, wash water and fines slurry pumps, but not for other auxiliaries such as lube oil pump, lights, instruments and control room air conditioning. Actual electricity productions and thermal efficiencies would, therefore, be slightly lower.

With reference to FIG. 2, solid fuel from a suitable source is supplied through a conduit 201 to a conventional grinding and slurrying system 202 in which it is mixed with water coming from a suitable storage facility through a line 203, and recycled solution entering by means of a line 204. Ground, slurried or dissolved alkali is added to the mixture via a conduit 205. The water entering the apparatus via the line 203 may be of poor quality, even a waste water which would otherwise have required treatment before disposal. Alkali addition is adjusted so that the total amount in the slurry exceeds the chemical equivalent of the sulfur in the fuel as alkali sulfate.

If the fuel were to be supplied by slurry pipeline, items 201 to 205, incl. would be replaced by a means for mixing alkali with the slurry and a buffer or holding tank for the alkalized charge.

A fuel slurry charge pump 206 draws the alkalized slurry from the system 202 and provides sufficient pressure to cause it to flow through a slurry preheat exchanger 207 and via a line 208 and a line 209 to a circulating fluidized bed combustion reactor 210. The preheated slurry enters the reactor 210 near its lower end (inlet zone).

Atmospheric air is drawn through a conduit 211 and a conventional filter 212 (to protect the apparatus from airborne solids) to the suction of a first stage air compressor 213, which delivers it hot and at an elevated pressure through a line 214 to an intercooler 215, in which it is cooled by indirect exchange with primary boiler feedwater.

Atmospheric air contains a variable amount of water vapor (humidity). Most of the water vapor carried by the air drawn into the apparatus condenses to liquid water in the intercooler 215 and is discharged with the cooled air into a line 216. This water is separated from the air in a second stage compressor suction drum 217 and a mist extractor 218 and removed from the apparatus through a valve 219. (A direct contact intercooler can be used in place of the indirect intercooler 215.)

From the mist extractor 218 the partially compressed air flows to the suction of a second stage air compressor 220 which delivers it hot and at a further increased pressure to a line 221 which supplies primary air to the combustion reactor 210 through connections 222 and 223. Since staged air introduction is a known means of minimizing the formation of nitrogen oxides, primary air may be considerably less than theoretically required for the complete combustion of the fuel with the remainder being added in increments through connections (not shown) above the fuel slurry inlet line 209.

Although the compressors 213 and 220 are shown as separate machines they could be considered as a single machine, with intercooling. Since the combustion is tolerant of water vapor, a single compressor, internally cooled by water injection, can readily be adapted to this embodiment.

The temperature in the inlet zone of the reactor 210 is such that fuel slurry water immediately vaporizes so that fuel and alkali particles become entrained in the upflowing air and water vapor, along with a quantity of hot recycled solids. Combustion of fuel particles is initiated and proceeds rapidly as the gas-solids mixture flows at relatively high, turbulent flow velocity through the reactor 210. Heat transferred from the mixture to a ring of vertical tubes lining the reactor 210, and containing boiling feedwater, plays a major role in preventing the reactor contents from exceeding a predetermined temperature. The heat transfer tubes (not shown) are supplied with hot feedwater by a feedwater manifold 228 and discharge a mixture of feedwater and steam into an outlet manifold 229.

Upon reaching the outlet of the combined 210, the reactor effluent flows through a crossover 224 to a hot cyclone separator 225. In the separator 225 centrifugal force causes most of the solid particles in the effluent to disengage from gaseous products and fall by gravity into a standpipe 226. Solids flow down the standpipe 226 in relatively dense phase, producing by their weight a pressure at the bottom somewhat above that existing at a similar level of the reactor 210. This pressure differential causes a major portion of the solid particles to flow via a seal, or trap, 227 to the inlet zone of the reactor 210 where it mixes with and heats incoming air and fuel slurry. The seal 227, which may have connections (not shown) to inject aeration air from the discharge of the compressor 220, serves to prevent combustion air from bypassing the reactor 210, by way of the standpipe 226, during startup or under upset conditions.

While not illustrated in this embodiment, solids recirculation may be assisted by an eduction device, utilizing the kinetic energy of combustion air and/or vaporizing fuel slurry, a version of which is diagrammed in FIG. 2 of U.S. Pat. No. 4,714,032.

Gaseous products, containing only fine solid particles unseparated by the cyclone 225, leave the reaction system through a manifold 232. The manifold 232 supplies the hot gases as heating media, via a line 233, to a steam superheat exchanger 234 and, via a line 235, to a secondary first stage flue gas reheat exchanger 236 and, via a line 237, to a second stage flue gas reheat exchanger 238. Having been cooled by indirect heat transfer in the exchangers 234, 236 and 238, gaseous products are recombined in a manifold 239 and flow to a primary first stage flue gas reheat exchanger 240. After giving an additional sensible heat in the exchanger 240 the cooled gaseous products flow via a line 241 to a secondary boiler 242 in which they are cooled below their dewpoint, indirectly transferring sensible heat and latent heat of water vapor to boiling feedwater. Condensation of water droplets on and around entrained solid particles wets them and effectively removes them from the gaseous phase.

Gases remaining uncondensed after passing through the boiler 242 (wet flue gas or gas-steam mixture), together with the condensed water and fine particles of ash and spent alkali, flow to a secondary feedwater heater 243 in which indirect heat transfer to secondary boiler feedwater further cools and dehydrates the wet flue gas, condensing additional water and washing from it any remaining solid particles. The resulting flue gas, together with water condensed in both the boiler 242 and the heater 243, carrying the wetted particles, known as fines slurry, is discharged into a flue gas separator 244.

In the separator 244 gravity causes the fines slurry to separate and collect in the bottom, forming a fines slurry level 245. This level is held within the proper operating range by withdrawing the net fines slurry production through a line 246, a pump 247 and lines 248 and 255 to and eductor 256, to which is also directed the net production of ash and spent alkali (sometimes referred to as "lash") withdrawn from the standpipe 226 through a line 230, and/or from the base of the reactor 210 through a line 231. In addition to the net production, the pump 247 and the line 248 may also supply fines slurry to the reactor 210 through a line 249 as internal recycle, entering the reactor 210 by means of an inlet connection 251. Alternatively or additionally, recycle may be routed to the reactor through a valve 252 and inlet connection 253 and/or through a valve 254 to mix with preheated fuel slurry in the line 209. These recycle injection locations are illustrative. In a given case, more or fewer locations may be specified.

The eductor 256 mixes the dilute fines slurry with the ash and spent alkali, which also carry with them from the reaction system gases which cause them to be in a fluidized state. The gases flow as bubbles with the combined slurry to an ash slurry deaeration drum 257. In the drum 257 gravity causes the fluidizing gas bubbles to disengage from the liquid slurry and join to form, along with an equilibrium amount of steam, a continuous gaseous phase in the upper part of the drum 257, from which they are vented under control of a vent valve 258 and via a line 259 to a suitable point in the heat recovery section of the apparatus, such as to the line 241.

Ash slurry, from which gas bubbles have been largely disengaged, leaves the deaeration drum 257 via a line 260 and the fuel slurry preheat exchanger 207, indirectly transferring therein a major portion of its sensible heat to fuel slurry on its way to the reactor 210. The level in the drum 257 is controlled, and proper pressure in the ash slurrying and cooling apparatus maintained, by a let-down valve, or device, 261, which discharges depressured, cooled ash slurry into a settler 262, in which gravity causes the solid particles to concentrate in a conical bottom section. Other known liquid-solids separating devices, such as centrifuges and Hydroclones, may be used in place of the gravity settler 262.

Slurry concentrated to the desired extent is withdrawn from the apparatus through a line 263. Salts dissolved in the water remaining with the ash comprise a purge, serving to prevent excessive accumulation in the system. The aqueous liquid in the upper section of the settler 262, from which most of the solids have been separated, is pumped by a recycle pump 264 through the line 204 to the grinding and slurrying system 202 as external recycle. If it is preferable, in a particular case, to dispose of ash and purge separately, ash may be concentrated to a maximum extent in the settler 262 (or alternative device) and purge diverted from the line 204 by means of a connection not shown.

Cooled and dehydrated flue gas leaves the top of the separator 244 through a mist extractor 265, to free it of entrained water droplets, and is then reheated, successively, by partially cooled gaseous products in the exchanger 240 and hot gaseous products in the exchanger 236. The reheated flue gas is then delivered through a line 268 to be expanded through a first stage flue gas turbine 269 which delivers mechanical energy, in the form of shaft horsepower, to the second stage air compressor 220.

Having been cooled by giving up energy in the turbine 269, the partially expanded flue gas flows via a line 270 to be reheated by hot gaseous products in the exchanger 238. The reheated flue gas is then delivered through a line 271 to be expanded a second time through a second stage flue gas turbine 272 which delivers mechanical energy, in the form of shaft horsepower, to the first stage air compressor 213.

Having been partly cooled by giving up energy in the turbine 272, the fully expanded flue gas, now at a pressure only slightly above atmospheric, flows via a line 273 to Heat Recovery Steam Generator (HRSG) 274, shown as (but not necessarily) operating in parallel, in respect to water and steam, with the secondary boiler 242. Transfer to heat to boiling feedwater in the HRSG 274 completes the cooling of the flue gas which is then released, through a suitable vent 275, to the atmosphere. To augment the production of steam from the HRSG 274, the line 273 may contain a "duct burner" (not shown) equipped to fire supplemental fuel.

Although, as shown, the HRSG 274 is arranged to generate low pressure steam, flue gas exhausted by the turbine 272, under some conditions of operation, may not be hot enough to generate a useful amount of high pressure steam, in which case the HRSG 274, or a section of it, would operate in parallel with the wall tubes of the reactor 210.

High quality boiler feedwater is supplied from outside the apparatus through a line 276, and given sufficient pressure by a primary boiler feewater pump 277 to cause it to flow through the intercooler 215, in which it is heated by indirect exchange with intermediate pressure compressed air, and then flows via a line 278 to join feedwater recirculated via a line 279 from a high pressure steam drum 280. The combined stream flows, via a line 281, to the manifold 228. Water from the manifold 228 is partially vaporized in the reactor tubes by indirect heat transfer from reactor contents, the resulting steam-water mixture being collected in the outlet manifold 229 and discharged to the steam drum 280.

In the drum 280 steam is separated from water and leaves through a mist extractor 282, which purifies it of entrained droplets on its way to the steam superheat exchanger 234, in which it is superheated by hot gaseous combustion products before leaving the illustrated apparatus through a line 283. A minor proportion of the steam leaving the mist extractor 282 or the line 283 and/or the air in the line 221 may be diverted (through lines not shown) to the turbines 269 and 272 as cooling agents to maintain blades and other stressed components within allowable temperatures.

The combined cycle is completed by expanding the superheated steam in an off-site condensing turbo-generator, condensate being returned to the line 276. In some cases, partially expanded steam may be returned to the combustion apparatus to be reheated in a heat exchanger (not shown) in parallel with the superheat exchanger 234, and then returned to the turbo-generator installation to complete its expansion.

Dissolved solids brought into the apparatus with the cold feedwater tend to accumulate in the water in the drum 280 and have to be purged from the system through a blowdown connection (not shown). Blowdown water is suitable for internal recycle, fuel slurry preparation or secondary boiler feedwater make-up.

Secondary boiler feedwater is supplied from outside the apparatus, under pressure from an offsite pump, through a line 284, to the secondary feedwater heater 243 in which it is heated by indirect transfer from wet flue gas (gas-steam mixture) and condensate leaving the secondary boiler 242. The heated feedwater in a line 285 is joined by water recirculated through a line 286 from a secondary steam drum 287. The combined feedwater divides, part receiving heat in the boiler 242 from cooling and condensing combustion products, some of the water being converted to steam. The balance of the combined feedwater is partially vaporized by heat transferred from expanded flue gas in the HRSG 274. Steam-water mixtures from the boilers 242 and 274 flow through a line 289 to the steam drum 287 in which a separation is performed between water, which recirculates via the line 286, and steam, which passes throuugh a mist extractor 290 and leaves the apparatus through a line 291.

Solids dissolved in the feedwater brought into the apparatus through the line 284 tend to accumulate in the water in the steam drum 287 and have to be purged through a blowdown valve (not shown). Blowdown water is suitable for use as internal recycle or as fuel slurry water.

In this embodiment, flue gas is reheated to as high a temperature as the heat content of combustion products allows. The turbines 269 and 272 produce more mechanical energy than consumed by the compressors 220 and 213, the excess being transmitted to generators 292 and 293, resp., which convert it into electricity, delivered as a product through a conduit 294. The diagrammatic representation of turbines, compressors and generators in FIG. 2 accurately depicts their energy relationships, but not necessarily their physical arrangment. In practice, it may be preferrable to route only sufficient reheated flue gas to the turbines 269 and 272 to permit them to produce the power needed by the compressors 220 and 213. The remainder would be directed to a separate turbo-generator, or turbo-generators, producing the product electricity.

Although the temperature of the combustion in this embodiment is lower than in conventional dry combustions it is higher than in the wet combustion embodiments of Patents A and B. In the contemplated temperature range the emission of sulfur dioxide, although higher than in the referenced embodiments, remains substantially below current standards. The formation of nitrogen oxides, on the other hand, is roughly of the order of current standards for this pollutant. Combustion products are delivered, however, under conditions (temperature, pressure and steam content) at which known scavenging agents for nitrogen oxides, such as ammonia and urea, are very effective. Therefore, it is contemplated that one of these agents (which may be diluted by an inert carrier, such as superheated steam) will be injected into, and mixed with, combustion products in the line 232 through a connection controlled by a valve 295 and/or partially cooled combustion products in the line 239 through a connection controlled by a valve 296. To practice Selective Non-catalytic Reduction (SNR) the agent is preferably introduced through the valve 295 whereas, for Selective Catalytic Reduction (SCR), the valve 296 is preferred. In the latter case, a bed of catalyst known to be effective in promoting the reduction reactions (not shown), would be inserted in the line 239. In either case, the agent injection may be divided among a plurality of injection nozzles and/or static or dynamic mixing devices installed downstream of the injection location(s).

In the embodiment of FIG. 2, cooling, condensation and transfer of solids to the aqueous phase are accomplished in the simplest manner, viz., indirect transfer of heat through the walls of exchangerr (or boiler) tubes. There are alternative means of carrying out these important steps. One of these is illustrated in FIG. 1 and FIG. 2 of patent B. Both the first cooling step (to below the dewpoint) and the second (which can also be considered a gas washing step) are carried out by direct contact with cooler water (or condensate recycled through a heat exchanger to cool it appropriately). More than one washing step may be specified for increased assurance of gas cleanliness.

Another alternative is illustrated in FIGS. 1 and 5 of Patent A and FIGS. 1, 2 and 6 of Patent B. In these embodiments, the second cooling (washing) step is carried out by counter-current contact with cooled recirculated water in a vertical column known as a flue gas dehydrator. This more complicated alternative is considered to provide the highest assurance of gas cleanliness and relatively pure condensate (distilled water) for cases in which extraneous water of poor quality is substituted for internal recycle.

While combustion products are available at a higher temperature than with previous embodiments, their heat content is not sufficient to reheat flue gas going to two turbine stages to as high a temperature as used in the latest gas-fired turbines. For a given combustion temperature this heat content, and therefore turbine inlet temperatures, may be increased by increasing the extent to which combustion temperature is controlled by water injection (internal recycle), at the expense of heat transfer to generation of primary steam. Maximum heat content and turbine inlet temperatures are realized when no primary steam is generated and the apparatus becomes a water injection embodiment.

FIG. 2 illustrates two stages of air compression, with intercooling between stages, and two stages of flue gas expansion, with reheating between stages. Such heat transfer embodiments may employ one to four stages of compression and usually, but not necessarily, the same number of stages of expansion. Intercooling and reheating, along with comparatively high turbine inlet temperature, is considered advanced combined cycle technology.

The configuration of compressors, turbines and generators in FIG. 2 is one of several representative of the industrial type of turbo-machinery. Instead, functions of the compressors 213 and 220 and part of those of the turbines 269 and 272 may be performed by a high ratio jet-derived turbo-compressor (with intercooling and possibly reheating), which would exhaust under pressure to a power recovery turbine driving a generator equivalent to the items 292 and 293.

A typical solid fuel would comprise a high sulfur coal. However, energy may also be recovered advantageously from fossil and other fuels considered low grade by virtue of their moisture content. If the amount of water required to slurry them is excessive the slurry may be concentrated, before charging to the combustion, by preheating to a temperature at which they become less hydrophilic and separating previously bound water (which may be recycled to the slurrying step), as described in Patent B. This preparation may be termed "slurry-phase carbonization" or "thermal pretreatment".

In most cases, a locally available mineral comprising calcium carbonate, such as limestone or dolomite, is the most economical alkali.

Although illustrated by means of atmospheric air as oxidant, other oxygen-containing gases, such as enriched air, may be substituted. Embodiments which supply pressurized gas and steam for purposes of Enhanced Oil Recovery may use an oxidant comprising predominently oxygen.

FIG. 3 diagrams a U-Tube combustor embodiment, alternative to the that associated with reactor 118 of FIG. 1. Flow of reactants is initially upward, then reverses direction and flows downward to a disengaging zone approximately at the elevation of the air-fuel slurry mixer. The recycle passage, connecting the upper part of the disengaging zone and the inlet of the venturi is external, rather than annular.

The conical bottom of the disengaging zone may contain aeration connections (not shown) through which air and/or steam is injected to maintain the the solid particles in free-flowing (or "fluidized") condition.

Crosshatching indicates refractory insulation, protecting the outer (pressure containing) steel shell from the high temperatures existing in reactor tube, recycle passage and disengaging zone. Although the outer shell of the combustor of FIG. 1 would be similarly protected, such simple protection is not possible for the tube 118, which is exposed to high temperatures on both sides. The configuration of the embodiment of FIG. 3 removes the containment of recycle from this difficult environment. Moreover, the air-fuel slurry mixer is more conveniently located for operator attention, nearer to grade level.

Although the transition from upflow to downflow in the FIG. 3 combustor could have been accomplished with a simple 180 degree bend, it is illustrated as utilizing a pair of tee-fittings, with their opposing ends capped, a construction found highly successful at minimizing erosion in the fluidized bed catalytic cracking units employed in petroleum refining.

In cases of solid fuels having a comparatively low ash fusion temperature and/or to which an ash fluxing agent has been added, the ash (or lash) particles may melt and enter the separating zone as droplets, which coalesce to form a "slag" in the conical bottom section. The slag would be withdrawn through the connection marked "Lash", observing the art according to known slagging combustors.

Figure 4:
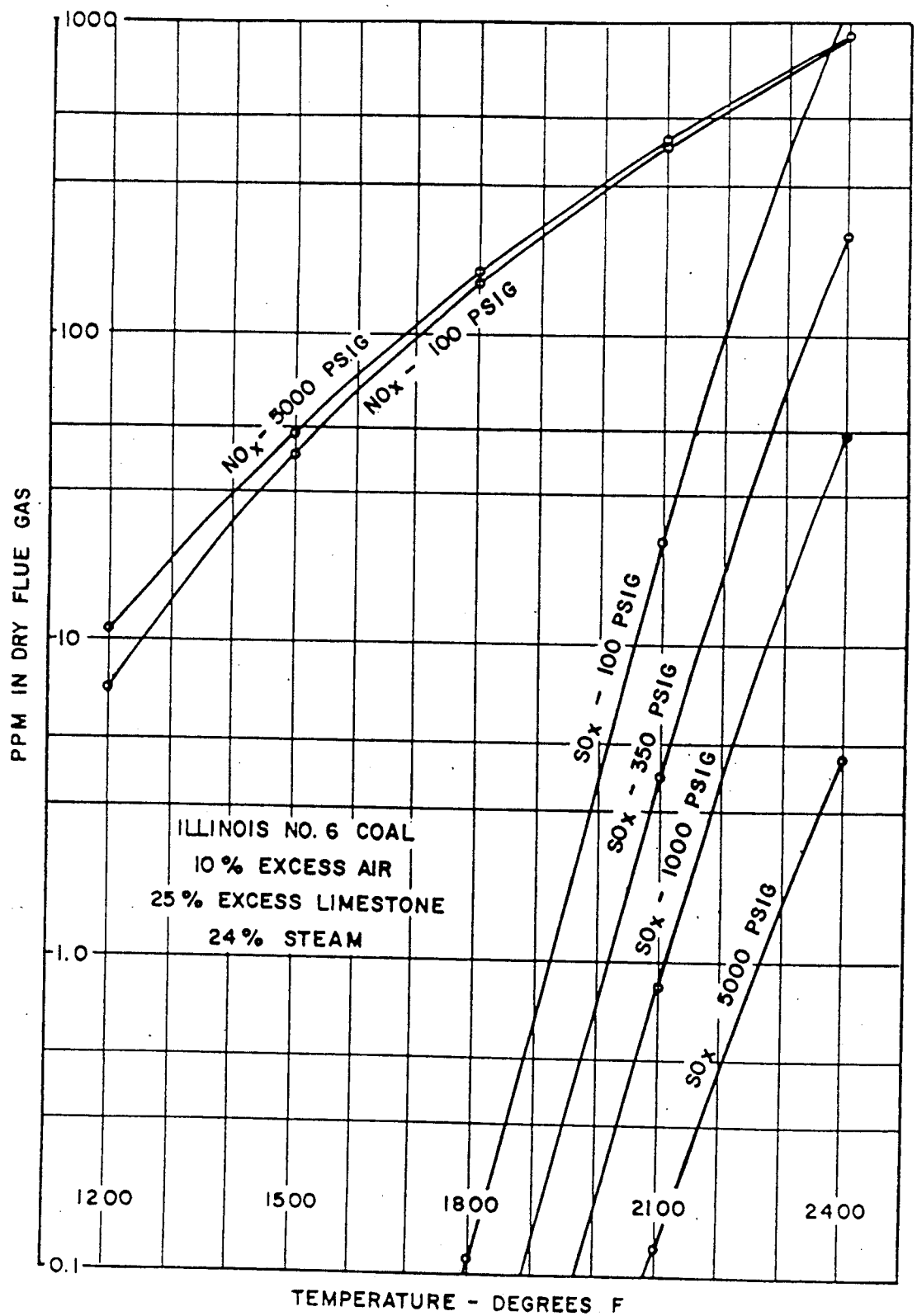
FIG. 4 plots the equilibrium content of sulfur and nitrogen oxides in dry flue gas, as functions of temperature and pressure, from burning a slurry of Illinois No. 6 coal containing 25 percent excess limestone, with 10 percent excess air, in an air-steam mixture containing 24 percent steam.

FIG. 4 presents the results of rigorous computations by the National Institute of Standards and Technology (formerly National Bureau of Standards) of the equilibrium contents of sulfur and nitrogen oxides in flue gas from the combustion of an Illinois No. 6 coal with 10 percent excess air, 25 percent excess alkali, in a steam-air mixture containing 24 percent steam. These computations used a NASA program (CET86) developed for rocket research. The fuel was assumed to have the following composition:

| | |
|---|---|
| C | 59.7 Wt. % |
| H | 4.4 |
| O | 8.4 |
| N | 1.0 |
| S | 3.9 |
| Ash | 9.6 |
| Water | 13.0 |

Dry flue gas from burning the above fuel conventionally would have a sulfur dioxide content of about 3600 ppm, which could be reduced by scrubbing conventionally with limestone slurry (at considerable expense) to about 360 ppm, barely able to meet 1989 emission regulations.

The lower family of curves presents the equilibrium content of sulfur oxides in dry flue gas in parts per million (ppm), as functions of temperature and pressure, when charged as an alkalized slurry and burned according to my inventions. Corresponding equilibrium contents of nitrogen oxides, under the same conditions, are shown by the upper pair of curves.

FIG. 4 reveals that the equilibrium concentration of nitrogen oxides is primarily a function of temperature, being little affected by pressure. The equilibrium concentration of sulfur oxides, on the other hand, is strongly influenced by both temperature and pressure. The usefulness of increasing pressure, at a given temperature, is evident, particularly when taking account that the concentration scale is logarithmic.

The assumptions for excess air and limestone are reasonable ones for boiler embodiments. However, steam contents in the oxidant mixtures will vary over a considerable range, being lowest in heat transfer embodiments and highest in steam and/or water injection embodiments. While the exact positions of the equilibrium lines change with steam concentration, the relationship between sulfur and nitrogen oxide contents, at a particular temperature and pressure, remains roughly the same.

Historically, gas turbine combustors have operated with much higher excess air. With increasing temperatures and steam injection, excess air has trended downward. When charging fuel as an aqueous slurry, excess air is reduced further, being 52 percent in the FIG. 1 example. Water injection decreases excess air even more although 10 percent would be considered rather extreme. Although computations quantifying the equilibrium effect of increased excess air are not available, theoretical considerations would lead one to expect that nitrogen oxides would increase and sulfur oxides decrease.

Equilibrium is a theoretical condition, approached but not reached in a practical apparatus. The approach is generally closer in boilers, which have a retention time of the order of 1–3 seconds, than in conventional gas turbine combustors, which have a retention time of the order of 20–50 milliseconds.

DISCUSSION OF THE INVENTION

My U.S. Pat. Nos. 4,377,066 (A) and 4,380,960 (B) describe methods of burning coal and other carbonaceous fuels under pressure in the presence of steam and alkali. Pressure, steam and alkali promote combustion so that essentially complete carbon conversion can be achieved, with minimum excess air, at temperatures lower than normally employed. These conditions, including reduced temperature, combine to direct the chemistry of sulfur compounds almost quantitatively to alkali sulfate, virtually eliminating sulfur dioxide from the flue gas. As is well known, reduction in temperature and excess air (as a percent of that theoretically required to convert carbon, hydrogen and sulfur in the fuel to carbon dioxide, water vapor and sulfur trioxide, resp.) also decreases the formation of nitrogen oxides so that emissions of both gaseous pollutants considered responsible for acid rain are comparatively low.

Pressure also substantially decreases the volume of gases to be processed and improves heat transfer coefficients, so that equipment is reduced in size and cost, being suitable for shop fabrication in capacities of the order of 100–400 Megawatts. Pressure has the further desirable effect of raising the dewpoint of combustion products and the temperature level at which, in steam boiler or combined cycle embodiments, latent heat can be recovered and utilized. Condensation of water during heat recovery, on and around particles of ash and other solid products, wets them and effectively removes them from the flue gas. This action eliminates from the flue gas the third major pollutant, "particulates".

These combustions are "wet" in the sense that solid fuels are charged as aqueous slurries, and additional water and/or steam may be injected into the combustion zone to control its temperature. Also, during heat recovery, steam in combustion products condenses to liquid water, permitting a thorough wet cleansing of the flue gas. In all embodiments, combustion temperature is predominently or entirely above the critical temperature of water (705.4 degrees F.), hence supercritical with respect to temperature. Pressure, however, is not necessarily above water's critical pressure of about 3200 psi. If the pressure is supercritical, water in the combustion zone is technically "dense phase" and the process may be termed "Supercritical Wet Combustion". If pressure is subcritical, water is "superheated vapor" and the process may be termed "Vapor Phase Wet Combustion".

The invention of Patent B is characterized by combustion zones in which fuel and alkali particles are entrained in an air-steam mixture whereas that of Patent A is characterized by fluidized bed combustion zones. My U.S. Pat. No. 4,714,032 describes a combustion process utilizing circulating fluidized bed reactors (CFBs). The parent case discloses the concept of operating such a combustion with sulfur-containing fuels in a temperature range in which flue gas sulfur dioxide contents are satisfactory, but nitrogen oxides formation higher than desirable, the latter pollutant being reduced by subsequent reaction, at essentially combustion pressure, with a known scavenging agent.

Co-pending application Ser. No. 290,368 is concerned with combinations of pressurized wet combustions, capable of consuming aqueous wastes, with fuel and other industrial conversions producing aqueous wastes and consuming energy and co-pending application Ser. No. 294,424 (now U.S. Pat. No. 4,898,107) is concerned with vapor phase wet combustion of aqueous wastes.

FIG. 4 brings out that, in the presence of steam and alkali, both temperature and pressure have strong effects on equilibrium content of sulfur dioxide. The equilibrium content of nitrogen oxides, on the other hand, is less strongly affected by temperature, and comparatively little by pressure. These unexpected relationships reveal a "temperature window" in which (under pressure) the equilibrium content of sulfur dioxide may be considered acceptable but that of nitrogen oxides not acceptable. Taking as a desirably low level, for purposes of illustration, an equilibrium content for both pollutants of 100 ppm, FIG. 4 discloses that (under its assumptions) this criteria is met at temperatures up to about 1700 degrees F., nitrogen oxides being safely below 100 ppm at 1600 degrees.

As temperature is increased further, the equilibrium content of sulfur oxides remains below 100 ppm, at 100 psig and above, up to about 2200 degrees, but that of nitrogen oxides rises to about 500 ppm. I have discovered that this temperature range (1600-2200 degrees) essentially overlaps that (1600-2000 degrees) in which non-catalytic reduction of nitrogen oxides with ammonia (SNR) has proven effective. A content of 500 ppm requires an 80 percent reduction to achieve 100 ppm. SNR has demonstrated at least a 70 percent reduction at atmospheric pressure. Since, with increasing pressure, the mean free path of reactant molecules is reduced, it is not unlikely that the reduction, at 100 psig and above, can be 80 percent or better.

If the target level for nitrogen oxides were reduced to 50 ppm, and the scavenging reactions assumed to have the same 80 percent effectiveness, the temperature window would narrow to 1600 to about 1900 degrees. On the other hand, if the nitrogen oxides specification were relaxed and/or the effectiveness of the scavenging reactions shown to be better than 80 percent, the temperature window could be extended, particularly at pressures higher than 100 psi, to temperatures as high as 2500 or 2600 degrees, provided that it remain below a temperature at which ash (or lash) constituents become sticky so as to adhere to the surfaces of the reactor, solids separating or heat exchange devices. This solid fuels combustion thus utilizes a little-used temperature "niche" between that of the parent and referenced cases and the known fluidized bed combustions (up to 1600 degrees) and conventional atmospheric combustions (above 2600 degrees.)

The nominal pressure of the Example for FIG. 1 is 500 psi. While FIG. 4 would have to be extrapolated a bit to predict equilibria for a combustion temperature of 2500 degrees, it is not inconsistent (after 80 percent reduction of NOx by SNR) with an expectation of less than 200 ppm for this pollutant. Moreover, measured NOx contents reported for ISTIG tests firing natural gas, perhaps because of short residence times, give reason to expect contents lower than equilibrium, leading to at least the possibility that pollutant levels would be acceptable even without SNR.

Nitrogen oxides are generally considered to come from two sources: decomposition of organic nitrogen compounds in the fuel, which is called "fuel NOx", and fixation of nitrogen in the combustion air, which is called "thermal NOx". It is known that fuel NOx can be reduced by staging the introduction of air into the combustion zone. The reactor embodiments of FIGS. 1 to 3 are suitable for introducing primary air with the fuel and increments downstream of the initial air-fuel mixing. It is also reported, from CWF combustion experiments, that increased dilution decreases the formation of NOx. The fuel slurry water charged to my combustions is normally diluted by about two-thirds more water than in a typical CWF and, since it has small effect on efficiency, dilution can be increased even further if NOx considerations warrant.

It is a common requirement of combustors, conventional or new, that fuel and air must be brought quickly to a temperature high enough to initiate combustion (ignition). Coal-Water fuels (CWFs) are more difficult to ignite than pulverized dry coal because of the heat absorbed by evaporation of slurry water. Since the slurry charged to my combustions generally contains more water than a typical CWF, it would appear that even more than the usual amount of heat must be supplied to the inlet zone. An offsetting factor is the fact that pressure, steam and alkali lower the ignition temperature. Nevertheless, a relatively high inlet zone temperature speeds the combustion reactions so as to minimize the time (and hence reactor volume) required.

The "bubbling bed" type of fluidized bed reactor is essentially isothermal so that fuel and air are immediately brought to an average combustion temperature. The circulating type of fluidized bed relies on the heat content of recirculated solid products to heat incoming fuel and air. A cyclone separator is the device conventionally used to separate solids for this purpose. At atmospheric pressure the recirculation rate may be so high that the inlet zone temperature approaches that of the recycled solids. When a CFBC is put under pressure its capacity to recirculate solids decreases.

When increase of pressure so restricts solids recirculation that it is no longer possible to achieve a suitably high inlet zone temperature, it is possible to supplement the heat input by one or more of the four methods described in Patent B (Cols. 22 and 23). Alternatively, one may switch to the entrained phase reactor form illustrated in the embodiments of FIGS. 1 and 3.

The latter embodiments utilize the fourth method (d), viz., "recycling of hot combustion products". Since it does not depend on density differences between columns, and the recycle actually decreases the solids loading in the reactor, it can be designed to produce the desired inlet zone temperature at any pressure. A variation is to recycle hot combustion products from which most of the solids have been separated, as from the line 135 of FIG. 1.

With a concentric internally recycling reactor, as in FIG. 1, there can be appreciable heat transfer through the wall separating the reactor from the recycle conduit, particularly near the inlet zone. Total capacity may be divided among a number of parallel reactors so as to increase the surface through which this heat transfer can occur.

Moreover, the velocity in an up-flow (nominally) entrained phase reactor may be low enough that gravity causes appreciable slip of solid particles, increasing the solids retention time and loading, relative to the net throughput of the respective phases. In fact, the gas velocity could be anywhere within a range from that which results in negligable slip (above roughly 15 feet per second) to that which permits substantial increase in solids loading. In the latter case, the distinction between entrained phase and fluidized bed may virtually disappear and a reactor embodiment come to resemble, to a considerable degree, that of FIG. 3 or FIG. 8 of Patent A. Increased solids retention time is useful when burning relatively large or refractory fuel particles.

The Coal-Water Fuels (CWFs) being tested at the time of this application have the limited objective of enabling furnaces and boilers designed for oil and gas to substitute a coal-based fuel. In keeping with the general belief that fuel moisture has to be restricted, in the interests of flame stability and thermal efficiency, water contents are held to a range of about 25-30 percent. To secure satisfactory fluid properties with so little water, the coal must be ground to strict particle size specifications and treated with expensive chemical additives.

Since such furnaces and boilers are not ordinarily equipped to process much fly ash or remove sulfur dioxide, premium coals, low in ash and sulfur, must be specified and/or strenuous beneficiation undertaken to minimize these impurities. Even so, boilers must be derated, relative to capacity with oil or gas, and suffer loss of thermal efficiency. Moreover, a baghouse or precipitator must be added to control particulate emissions. Virtually all of the fuel sulfur is converted to sulfur dioxide.

With limited objectives and all these drawbacks and expenses, it is not surprising that CWFs have enjoyed little commercial acceptance at the time of this application. It is expected that CWFs for firing gas turbines will have specifications for ash, sulfur and particle size even more stringent (and expensive) than those for firing boilers.

In contrast to the known CWF art, the processes of my inventions relax restrictions on sulfur, ash and slurry water. While there are residence time and/or carbon conversion advantages to small particle size, requirements are less stringent than for the concentrated CWFs or those heretofore used for direct firing of gas turbines. No chemical additives are required. Thermal efficiencies are high (latent heat loss, in boiler and combined cycle embodiments, usually being no greater than from dry combustions). Yet, emissions of sulfur and nitrogen oxides and particulates can be well within current regulations.

Because of these characteristics, my processes form particularly advantageous combinations with coal slurry pipelines. Instead of the conventional steps of dewatering and drying, entailing the necessity to dispose of contaminated water, coal slurry is charged as received (or with a minimum of particle size reduction), after only adjustment of alkali content. Except in gas turbine embodiments, the equivalent of slurry water can be recovered as valuable distillation purified water.

There are physical processes of beneficiation which require that the raw coal be ground and slurried in water. They can be fairly effective at reducing contents of ash and chlorides and moderately successful in reducing sulfur but are handicapped, in relation to conventional dry combustions, by the necessity (as with pipeline slurries) to dewater and dry before burning. While beneficiation is not considered necessary with my wet combustions, they do combine advantageously with these processes, no dewatering nor drying being required. There can be some saving in capacity to charge, process and discharge ash and less limestone is consumed. Moreover, the reduction in chlorides can lessen stress corrosion of equipment and/or permit the use of less expensive materials of construction.

Pressurized combustions necessarily entail the recovery of pressure energy in flue gas. Because the processes of my inventions provide for wet cleansing of flue gas, turbines are not subject to the severe blade erosion and deposits which defeated earlier (and continue to hamper) attempts to develop pressurized coal-fired boilers and gas turbines.

Gas turbine combustion reactors are conventionally coupled closely with, and mounted on the same base with, the compressor and turbine. An off-base combustion system, however, can permit residence time adequate for essentially complete combustion of larger and more refractory fuel particles, and also allow space (and time) for nitrogen oxide reduction, ash removal and gas washing. On-base combustors have residence times of a fraction of a second whereas combustion reactors as described herein may readily and economically have residence times up to several seconds although one second is usually more than adequate.

The embodiment of FIG. 1 differs from the conventional concept of a coal slurry-fired, intercooled steam injected gas turbine (ISTIG) combustor in these significant ways:

1. The coal requires little or no beneficiation;
2. Alkali (such as ground lime or limestone) in excess of the sulfur equivalent is added to the fuel slurry;
3. The slurry is burned with comparatively low excess air;
4. Heating value permitting, combustion temperature may moderated by injection of water as well as waste heat steam;
5. Separation of most of the solid products is straight-forward, as in a cyclone separator;
6. Remaining dust and vaporized salts are removed from cooled gaseous products in a condensing scrubber, producing turbine inlet fluid of unprecedented cleanness;
7. The resulting fines slurry is mixed with the solid products, providing a means of recovering their heat and simplifying depressuring;
8. The hot ash slurry heats the incoming coal slurry;
9. Washed gaseous products are reheated by exchange with (unwashed) gaseous products before going to the turbines.
10. If necessary, a NOx scavenger is employed at essentially combustion pressure to bring its content down to the desired level;

To take advantage of the higher combustion and turbine inlet temperatures, it becomes crucial that advanced high temperature materials and technology also be employed in the design and construction of the reheat exchanger(s). Conventional alloy exchanger tubes are limited to a temperature of roughly 1750 F. Ceramic heat transfer surface, capable of the upper limits of the range are available. The expensive ceramic surface would be limited to the highest temperature section, alloy surface being suitable for the bulk of the duty. Besides utilizing resistant materials it is desirable that the possible advantages of recuperative (or regenerative) heat exchange, including rotating types similar to those used or tested for air preheating (Lungjstrom type) and earlier and current gas turbine cycles, be considered.

The subject gas turbine combustion embodiments are direct-fired as are most conventional cycles. Reheating, by exchange, of the fluid (after having been cooled below its dewpoint) introduces a resemblance to externally fired gas turbine cycles.

The embodiment of FIG. 1 has the advantage over known STIG and ISTIG combustions that it can be fueled with low cost simple coal slurry. It is a more direct and efficient means of utilizing solid fuel in a gas turbine than the often-advocated route of coal gasification and clean-up of the coal gas prior to combustion, and the newer "hybrid" concept of partial gasification combined with combustion of the residual "char". Moreover, it is capable of higher ratios of steam and/or water injection than with the comparatively low heating value coal gas.

Because combustion conditions provided by the process of the invention effectively suppress the formation of sulfur oxides, it has been described and illustrated with respect to slurries of high sulfur coals, i.e., those containing more than about 1 percent sulfur. Not to be overlooked, however, is its attractiveness for fuels considered low grade for properties other than sulfur content. Such fuels include (but are not limited to) peat, lignite, forestry and agricultural by-products, municipal waste and sewage sludge. In boiler and combined cycle embodiments, the latent heat of fuel moisture is recovered, making available the dry heating value of the fuel—a substantial advantage over conventional atmospheric combustions with which the latent heat goes up the stack. In gas turbine embodiments such wet fuels are not placed at disadvantage since fuel moisture adds to the mass flow going to the turbines.

A timely example is Refuse Derived Fuel (RDF), the combustible fraction of Municipal Solid Waste after "Resource Recovery" (separation of recyclable iron, glass and aluminum). Unless dried, with corresponding consumption of energy, RDF is an inherently high moisture fuel. My invention combines particularly well with wet resource recovery processes, which produce RDF as an aqueous slurry or wet press cake. Although not necessarily required for all high moisture fuels, addition of alkali (as with coal slurries) is frequently desirable to neutralize acids formed during combustion.

In order to increase the concentration or "energy density" of slurries of certain high moisture fuels, it is often desirable to preheat them to a temperature at which a molecular rearrangement occurs, freeing formerly bound water, followed by a physical separation of the freed water. The concentrated slurry is charged to the combustion and the freed water may be returned to raw fuel slurrying. These steps can be efficiently integrated with embodiments such as those of FIGS. 1 and 2.

Combustible contaminants in fuel slurry and/or injection water are subjected to strongly oxidizing conditions and burn in the reactor along with the fuel whereas non-combustible contaminants are deposited on ash and spent limestone particles. Therefore, waste waters, including many classified as hazardous, may be disposed of in this manner, saving the cost of treatment otherwise required. Withdrawal of injection water from the HRSG for injection into the reactor comprises a high rate of blowdown, so that feedwater specifications may be relatively lenient.

Service requirements of enhanced oil recovery (EOR), and the application of my solid fuel combustions thereto, have been described in Patent B (Cols. 2, 3 and 26). The CFB type of combustion apparatus, described in the parent case and U.S. Pat. No. 4,714,032, and the higher combustion temperature range embodiments of this application, particularly that of FIG. 1, afford potential gains in flexibility and thermal efficiency.

As pointed out in Patent B, substitution of oxygen for combustion air results in production of comparatively pure, pressurized carbon dioxide instead of flue gas. Likewise, carbon dioxide-steam mixtures may be produced instead of flue gas-steam mixtures. Both of these products, which have important EOR applications, are available from embodiments incorporating the presently-described improvements. Clean, hot, pressurized flue gas may be diverted from the line 267 or the line 268 of FIG. 2, up to an extent that the turbine 269 and 272 produce only enough power for the compressors 220 and 213, or from the line 271, up to an extent that the turbine 272 produces only enough power for the compressor 213.

With minor modifications, the embodiment of FIG. 1 illustrates a relatively simple apparatus suitable for delivering clean, hot, flue gas-steam (or, with the substitution of pressurized oxygen for compressed air, carbon dioxide-steam) mixture to an underground formation as a source of both heat and gas pressure. Such fluid may be diverted from the line 152, up to an extent that the discharge pressure of the turbine 156 falls to near atmospheric (turbine 158 and generator 160 then becoming redundant), or from the line 155 or the line 157.

FIG. 2 of U.S. Pat. No. 4,714,032 describes an embodiment suitable for powering short haul railway locomotives. The embodiment of FIG. 1 of the present case is a more advanced and efficient embodiment which could be adapted to more powerful, long haul locomotives. In this service, horizontal entrained phase reactors would afford the advantage that they require little head room. Compact jet engine-derived turbo-machinery can be utilized. Higher combustion temperature and pressures improve range and efficiency. On-board fuel slurry, water and ash slurry storage would have to be provided.

Ship propulsion represents a further advantageous application of my inventions. Because of an abundant supply of cooling water for steam condensers, ships can advantageously adapt the embodiment of FIG. 2, although restricted head room might make preferable a horizontal entrained phase reactor (or reactors), such as FIG. 5 of Patent B. Main source of propulsion energy would be superheated steam, as from the line 283, by means of a conventional condensing steam turbine cycle (external steam loop). The gas turbines 269 and 272 (or separate turbo-generators) might be arranged for delivering supplemental energy, either for propulsion or for auxiliary use, such as the shipboard electrical system. Low pressure steam would supply heating, hot water, refrigeration, etc. Limited space might make it desirable to substitute jet-derived turbo-machinery, similar to that illustrated in FIG. 1, for the corresponding items of FIG. 2.

Gas turbine embodiments, such as FIG. 1, has the disadvantage, for ship propulsion, that a supply of fresh water would have to be carried. However, with the addition of a salt water-cooled condenser in the exhaust line 170, most of the steam otherwise exhausted to the atmosphere could be condensed for recycling. Ash slurry would, except when in port, be discharged into the sea.

As described in connection with FIG. 1 of U.S. Pat. No. 4,714,032, one can also, with special attention to materials of construction, convert salt water to fresh distilled water, saving space and weight for more valuable cargo.

Having described my invention, I claim:

1. A continuous process of combusting an aqueous slurry of solid fuel particles so as to provide a clean, hot, pressurized fluid for driving a gas turbine expander comprising the steps of:
    pressurizing the fuel slurry;
    pressurizing an oxygen-containing gas;
    mixing the fuel slurry and the oxygen-containing gas in an inlet zone of an elongated combustion reactor;
    permitting the fuel particles to burn in the presence of at least one atmosphere of steam while controlling the maximum temperature within a range of 1600 to 2600 degrees F, forming gaseous and solid combustion products;

cooling gaseous products, carrying entrained solid product particles, at essentially combustion pressure, to a temperature below their dewpoint, resulting in a clean gas-steam mixture and an aqueous fines slurry containing the solid particles;

reheating the gas-steam mixture to an approach to combustion temperature;

conducting the reheated mixture to the inlet of the gas turbine.

2. A combustion process as in claim 1 in which the temperature of the inlet zone is increased at least enough to vaporize the slurry water and initiate combustion by recycling solid products thereto.

3. A combustion process as in claim 1 in which the temperature of the inlet zone is increased at least enough to vaporize the slurry water and initiate combustion by recycling uncooled gaseous products thereto.

4. A combustion process as in claim 1 in which the maximum temperature is controlled by regulating the ratio of fuel slurry to oxygen-containing gas.

5. A combustion process as in claim 1 in which the excess of oxygen-containing gas over that theoretically required for complete combustion of the fuel is between 5 and 20 percent and the maximum temperature is controlled by the indirect transfer of heat through heat exchange surface.

6. A combustion process as in claim 1 in which the maximum temperature is controlled by the injection of water.

7. A combustion process as in claim 1 in which the gas-steam mixture, partially cooled by expansion in the turbine, exhausts to a Heat Recovery Steam Generator, at least a part of the steam generated therein being injected into the combustion reactor.

8. A combustion process as in claim 1 in which part of the oxygen-containing gas is mixed with the fuel slurry in the inlet zone and the remainder is added in one or more increments at intervals downstream of the inlet zone.

9. A combustion process as in claim 1 in which the solid fuel comprises a fossil fuel and alkali is added to the fuel slurry in an amount in excess of the chemical equivalent of the sulfur in the fuel as alkali sulfate.

10. A combustion process as in claim 1 in which the solid fuel comprises a solid waste material.

11. A combustion process as in claim 10 in which the aqueous slurry of the solid waste material has been thermally pre-treated and concentrated by the separation of formerly bound water before mixing with the oxygen-containing gas.

12. A combustion process as in claim 1 in which at least part of the aqueous component of the fuel slurry comprises a waste water which would otherwise have required treatment before disposal.

13. A combustion process as in claim 1 in which a compound known to react with nitrogen oxides is added to and mixed with the hot gaseous products, at essentially combustion pressure, in an amount at least the molal equivalent of the nitrogen oxides present therein.

14. A combustion process as in claim 13 in which the compound known to react with nitrogen oxides is added to and mixed with the gaseous products after they have been partially cooled, at essentially combustion pressure, to a temperature below 2000 degrees F.

15. A combustion process as in claim 1 in which partially pressurized oxygen-containing gas is cooled by indirect heat exchange before the completion of its pressurization.

16. A combustion process as in claim 1 in which partially pressurized oxygen-containing gas is cooled by direct contact with water before the completion of its pressurization.

17. A combustion process as in claim 1 in which the solid product particles, excepting those entrained in the gaseous products, accompanied by unseparated gases, are mixed with at least a portion of the fines slurry, vaporizing some of its water and forming an ash slurry phase and a gas phase containing the vaporized slurry water which is recombined with the gaseous products.

18. A combustion process as in claim 17 in which the clean gas-steam mixture is washed with sufficient water that, after combining with the fines slurry and mixing with the solid product particles, the heat content of the ash slurry is sufficient to preheat the fuel slurry, by indirect exchange, to a temperature approaching that of the ash slurry.

19. A combustion process as in claim 1 in which the oxygen-containing gas is pressurized by the compressor section of a gas turbine set from which it is transported to the point of mixing with the fuel slurry, and the reheated gas-steam mixture is transported to the inlet of the turbine section of the gas turbine set.

20. A combustion process as in claim 19 in which at least part of the steam generated in a Heat Recovery Steam Generator, to which the turbine section exhausts, is injected into the combustion reactor.

21. A combustion process as in claim 19 in which water is withdrawn from a boiler of the Heat Recovery Steam Generator, to which the turbine section exhausts, and injected into the combustion reactor.

* * * * *